US012587796B2

(12) United States Patent
Derleth et al.

(10) Patent No.: US 12,587,796 B2
(45) Date of Patent: Mar. 24, 2026

(54) METHOD OF OPTIMIZING AUDIO PROCESSING IN A HEARING DEVICE

(71) Applicant: SONOVA AG, Staefa (CH)

(72) Inventors: Ralph Peter Derleth, Hinwil (CH); Gilles Courtois, Uerikon (CH)

(73) Assignee: Sonova AG, Staefa (CH)

( * ) Notice: Subject to any disclaimer, the term of this patent is extended or adjusted under 35 U.S.C. 154(b) by 165 days.

(21) Appl. No.: 18/407,021

(22) Filed: Jan. 8, 2024

(65) Prior Publication Data

US 2024/0292161 A1 Aug. 29, 2024

(30) Foreign Application Priority Data

Feb. 27, 2023 (EP) .................................... 23158805

(51) Int. Cl.
*H04R 25/00* (2006.01)

(52) U.S. Cl.
CPC ......... *H04R 25/505* (2013.01); *H04R 25/552* (2013.01); *H04R 2225/41* (2013.01); *H04R 2225/43* (2013.01)

(58) Field of Classification Search
CPC ................ H04R 25/505; H04R 25/552; H04R 2225/41; H04R 2225/43; H04R 2460/01; G10L 21/0208
See application file for complete search history.

(56) References Cited

U.S. PATENT DOCUMENTS

| | | | | |
|---|---|---|---|---|
| 2008/0130914 | A1* | 6/2008 | Cho | G10L 21/0208 381/94.1 |
| 2009/0046878 | A1* | 2/2009 | Sorgel | H04R 25/305 381/317 |
| 2022/0021993 | A1 | 1/2022 | Hildebrand et al. | |

FOREIGN PATENT DOCUMENTS

| | | | |
|---|---|---|---|
| DE | 102019206743 | A1 | 11/2020 |
| WO | 2020152323 | A1 | 7/2020 |

OTHER PUBLICATIONS

European Search Report and Written Opinion received in European Application No. 23158805.4 received Oct. 23, 2023.

* cited by examiner

*Primary Examiner* — Angelica M Mckinney
(74) *Attorney, Agent, or Firm* — ALG Intellectual Property, LLC

(57) ABSTRACT

The disclosure relates to a method of optimizing audio processing in a hearing device configured to be worn at an ear of a user, the method comprising receiving an input audio signal; processing the input audio signal by a plurality of audio processing algorithms executed in a sequence and/or in parallel to generate a processed audio signal; and outputting, by an output transducer included in the hearing device, an output audio signal based on the processed audio signal so as to stimulate the user's hearing.

19 Claims, 4 Drawing Sheets

METHOD OF OPTIMIZING AUDIO PROCESSING IN A HEARING DEVICE

RELATED APPLICATIONS

The present application claims priority to EP Patent Application No. 23158805.4, filed Feb. 27, 2023, the contents of which are hereby incorporated by reference in their entirety.

BACKGROUND

Hearing devices may be used to improve the hearing capability or communication capability of a user, for instance by compensating a hearing loss of a hearing-impaired user, in which case the hearing device is commonly referred to as a hearing instrument such as a hearing aid, or hearing prosthesis. A hearing device may also be used to output sound based on an audio signal which may be communicated by a wire or wirelessly to the hearing device. A hearing device may also be used to reproduce a sound in a user's ear canal detected by an input transducer such as a microphone or a microphone array. The reproduced sound may be amplified to account for a hearing loss, such as in a hearing instrument, or may be output without accounting for a hearing loss, for instance to provide for a faithful reproduction of detected ambient sound and/or to add audio features of an augmented reality in the reproduced ambient sound, such as in a hearable. A hearing device may also provide for a situational enhancement of an acoustic scene, e.g. beamforming and/or active noise cancelling (ANC), with or without amplification of the reproduced sound. A hearing device may also be implemented as a hearing protection device, such as an earplug, configured to protect the user's hearing. Different types of hearing devices configured to be worn at an ear include earbuds, earphones, hearables, and hearing instruments such as receiver-in-the-canal (RIC) hearing aids, behind-the-ear (BTE) hearing aids, in-the-ear (ITE) hearing aids, invisible-in-the-canal (IIC) hearing aids, completely-in-the-canal (CIC) hearing aids, cochlear implant systems configured to provide electrical stimulation representative of audio content to a user, a bimodal hearing system configured to provide both amplification and electrical stimulation representative of audio content to a user, or any other suitable hearing prostheses. A hearing system comprising two hearing devices configured to be worn at different ears of the user is sometimes also referred to as a binaural hearing device. A hearing system may also comprise a hearing device, e.g., a single monaural hearing device or a binaural hearing device, and a user device, e.g., a smartphone and/or a smartwatch, communicatively coupled to the hearing device.

Hearing devices are often employed in conjunction with communication devices, such as smartphones or tablets, for instance when listening to sound data processed by the communication device and/or during a phone conversation operated by the communication device. More recently, communication devices have been integrated with hearing devices such that the hearing devices at least partially comprise the functionality of those communication devices. A hearing system may comprise, for instance, a hearing device and a communication device.

Since the first digital hearing aid was created in the 1980s, hearing aids have been increasingly equipped with the capability to execute a wide variety of increasingly sophisticated audio processing algorithms intended not only to account for an individual hearing loss of a hearing impaired user but also to provide for a hearing enhancement in rather challenging environmental conditions and according to individual user preferences. Those increased signal processing capabilities, however, also come at a cost that it is less easy to predict whether a desired goal of the signal processing is met, in particular when a plurality of audio processing algorithms are executed in a sequence and/or in parallel, with the aggravating circumstance that such a goal often changes quickly, e.g., depending on a momentary acoustic scene in the user's environment and/or depending on the user's individual preferences.

A particular goal of the signal processing of a hearing device is to modify the acoustic input into an acoustic output suited better than the unmodified input to allow a person with reduced hearing capabilities to perceive the acoustic information in a reliable and comfortable fashion. The continuously developed and improved signal processing features, however, which were only designed to solve/modify certain aspects of the input audio signal, also require a continuous optimization of the interplay between the single signal processing features such that the combination of those features would allow to reach the perceptual goals of the listener. Ideally, such an optimization would be performed during run-time of the hearing device and, if implemented, for an individualized hearing deficit, instead to the established method of performing such an optimization only initially during a definition of the interplay between features of a respective product and a subsequent individualization during a fitting phase. More particularly, the hearing device itself should monitor continuously whether an application of one or more sound processing features would result in an improved version of the input sound, e.g., with regard to perceptual hearing capabilities of the listener and/or another goal which shall be met by the signal processing of the input audio signal.

BRIEF DESCRIPTION OF THE DRAWINGS

Reference will now be made in detail to embodiments, examples of which are illustrated in the accompanying drawings. The drawings illustrate various embodiments and are a part of the specification. The illustrated embodiments are merely examples and do not limit the scope of the disclosure. Throughout the drawings, identical or similar reference numbers designate identical or similar elements. In the drawings.

DETAILED DESCRIPTION OF THE DRAWINGS

Figure 1:
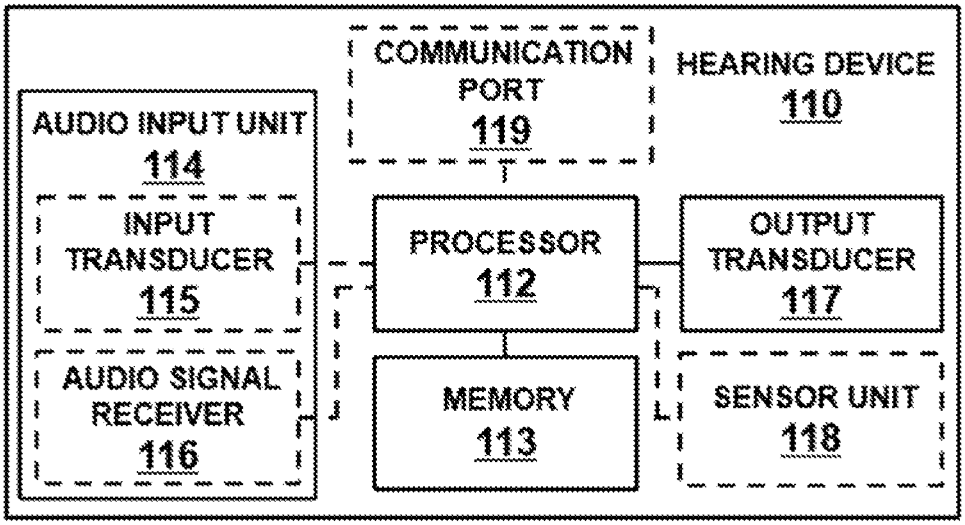
FIG. 1 schematically illustrates an exemplary hearing device.

The disclosure relates to method of optimizing audio processing in a hearing device configured to be worn at an ear of a user. The disclosure further relates to a hearing device configured to perform the method.

It is a feature of the present disclosure to avoid at least one of the above mentioned disadvantages and to propose a method of operating a hearing device in which a desired signal processing goal can be met when an input audio signal is processed by a plurality of audio processing algorithms executed in a sequence and/or in parallel. It is another feature to provide for an improved operation of a hearing device in which a signal processing involving a plurality of processing algorithms executed in a sequence and/or in parallel can be adjusted on the fly, e.g., in a continuous manner and/or during a normal operation of the hearing device, in particular to comply with a desired signal processing goal. It is yet another feature to account for a limited predictability and/or reliability of the processing of an input audio signal involving a plurality of signal processing algorithms, in particular by providing for a continuous adaptability of the signal processing algorithms which may be performed in an automized manner. It is a further feature to provide a hearing device and/or hearing system which is configured to operate in such a manner.

At least one of these features can be achieved by one or more of the methods and/or devices described herein.

Accordingly, the present disclosure proposes a method of optimizing audio processing in a hearing device configured to be worn at an ear of a user, the method comprising receiving an input audio signal;

processing the input audio signal by a plurality of audio processing algorithms executed in a sequence and/or in parallel to generate a processed audio signal;

outputting, by an output transducer included in the hearing device, an output audio signal based on the processed audio signal so as to stimulate the user's hearing;

comparing the input audio signal and the processed audio signal to determine at least one deviation characteristic indicative of a deviation of the processed audio signal from the input audio signal;

selecting, depending on the deviation characteristic, at least one of the audio processing algorithms; and controlling the selected audio processing algorithm to adjust the processing of the input audio signal.

Thus, by comparing the input audio signal and the processed audio signal to determine the at least one deviation characteristic, it can be verified whether the processed audio signal corresponds to a desired signal processing goal, and, in a case in which the processed audio signal would not fulfill those requirements, appropriate measures can be invoked to approach the processed audio signal to the desired signal processing goal by the selecting and controlling of the at least one audio processing algorithm to adjust the processing of the input audio signal accordingly.

The present disclosure also proposes a non-transitory computer-readable medium storing instructions that, when executed by a processor, which may be included in a hearing device and/or a hearing system, cause a hearing device and/or a hearing system to perform operations of the method.

Independently, the present disclosure also proposes a hearing device configured to be worn at an ear of a user, the hearing device comprising an input transducer configured to provide an input audio signal indicative of a sound detected in the environment of the user; a processor configured to process the input audio signal by a plurality of audio processing algorithms executed in a sequence and/or in parallel to generate a processed audio signal; and an output transducer configured to output an output audio signal based on the processed audio signal so as to stimulate the user's hearing, wherein the processor is further configured to compare the input audio signal and the processed audio signal to determine at least one deviation characteristic indicative of a deviation of the processed audio signal from the input audio signal;

select, depending on the deviation characteristic, at least one of the audio processing algorithms; and control the selected audio processing algorithm to adjust the processing of the input audio signal.

Independently, the present disclosure also proposes a hearing system comprising a first hearing device configured to be worn at a first ear of a user, the first hearing device comprising a first input transducer configured to provide a first input audio signal indicative of a sound detected in the environment of the user, and a second hearing device configured to be worn at a second ear of a user, the second hearing device comprising a second input transducer configured to provide a second input audio signal indicative of the sound detected in the environment of the user, the hearing system further comprising a processor configured to process the first input audio signal and the second input audio signal by a plurality of audio processing algorithms executed in a sequence and/or in parallel to generate a first processed audio signal and a second processed audio signal; and each of the first and second hearing device further comprises an output transducer configured to output an output audio signal based on the first and second processed audio signal so as to stimulate the user's hearing, wherein the processor is further configured to compare the first and second input audio signal and the first and second processed audio signal to determine at least one deviation characteristic indicative of a deviation of the first and second processed audio signal from the first and second input audio signal;

select, depending on the deviation characteristic, at least one of the audio processing algorithms; and control the selected audio processing algorithm to adjust the processing of the first and second input audio signal.

Subsequently, additional features of some implementations of the method of operating a hearing device and/or the hearing device are described. Each of those features can be provided solely or in combination with at least another feature. The features can be correspondingly provided in some implementations of the method and/or the hearing device.

In some implementations, the method further comprises providing an expectation measure indicative of an expected deviation of the processed audio signal from the input audio signal corresponding to a desired outcome of said processing of the input audio signal; and determining whether said deviation characteristic matches the expectation measure, wherein said selecting of the audio processing algorithm and said controlling of the selected audio processing algorithm is performed in a case in which a mismatch between said deviation characteristic and the expectation measure has been determined.

In some implementations, the at least one selected audio processing algorithm is controlled to adjust the processing of the input audio signal according to predetermined adjustment instructions. In some implementations, the at least one selected audio processing algorithm is controlled to adjust the processing of the input audio signal according to adjustment instructions which depend on the deviation characteristic. For instance, when a large deviation between the deviation characteristic and expectation measure has been determined, the adjustment instructions may be provided such that they have a larger impact on the processing of the input audio signal by the selected audio processing algorithm as compared to, when a small deviation between the deviation characteristic and the expectation measure has been determined, the adjustment instructions may be provided such that they have a smaller impact on the processing of the input audio signal by the selected audio processing algorithm.

In some implementations, the method further comprises
- determining said desired outcome of said processing of the input audio signal based on at least one of
  - the input audio signal;
  - movement data provided by a movement sensor;
  - physiological data provided by a physiological sensor;
  - environmental data provided by an environmental sensor;
  - a user input entered via a user interface; and
  - location data and/or time data; and
- determining, based on the determined desired outcome of said processing of the input audio signal, said expectation measure.

In some implementations, the method further comprises
- comparing, after said controlling of the selected audio processing algorithm, the input audio signal and the processed audio signal to repeat said determining of said at least one deviation characteristic;
- determining whether said repeatedly determined deviation characteristic converges to the expectation measure.

In some implementations, the method further comprises, when it is determined that said repeatedly determined deviation characteristic diverges from the expectation measure,
- controlling the selected audio processing algorithm to set back the processing of the input audio signal according to the setting before said adjustment by the predetermined adjustment instructions; and/or
- inquiring an input from the user whether the user prefers the processed audio signal which has been processed before said adjustment by the predetermined adjustment instructions or the processed audio signal which has been processed after said adjustment by the predetermined adjustment instructions; and/or
- controlling the selected audio processing algorithm to readjust the processing of the input audio signal differing from the previously applied predetermined adjustment instructions; and/or
- selecting, depending on the deviation characteristic, at least another one of the audio processing algorithms differing from the previously selected audio processing algorithm; and controlling the selected other audio processing algorithm to adjust the processing of the input audio signal.

In some implementations, the desired outcome of said processing of the input audio signal comprises at least one of
- an enhancement of a speech content of a single talker in the input audio signal;
- an enhancement of a speech content of a plurality of talkers in the input audio signal;
- a reproduction of sound emitted by an acoustic object in the environment of the user, wherein audio content representative of the sound emitted by the acoustic object is separated from the input audio signal during said processing of the input audio signal;
- a reproduction of sound emitted by a plurality of acoustic objects in the environment of the user, wherein audio content representative of the sound emitted by the acoustic objects is separated from the input audio signal during said processing of the input audio signal;
- a reduction and/or cancelling of noise and/or reverberations in the input audio signal;
- a preservation of acoustic cues contained in the input audio signal;
- a suppression of noise in the input audio signal;
- an improvement of a signal to noise ratio (SNR) in the input audio signal;
- a spatial resolution of sound encoded in the input audio signal depending on a direction of arrival (DOA) of the sound and/or depending on a location of at least one acoustic object emitting the sound in the environment of the user;
- a directivity of an audio content in the input audio signal provided by a beamforming or a preservation of an omnidirectional audio content in the input audio signal;
- an amplification of sound encoded in the input audio signal adapted to an individual hearing loss of the user; and
- an enhancement of music content in the input audio signal.

In some implementations, the method further comprises
- classifying the input audio signal by attributing at least one class from a plurality of predetermined classes to the input audio signal, wherein said desired outcome of said processing of the input audio signal is determined depending on the class attributed to the input audio signal.

In some implementations, the audio processing algorithms comprise at least one of
- a gain model (GM), e.g., defining an amplification characteristic, which may comprise a gain compression (GC) and/or a frequency compression (FreqC) algorithm;
- a noise cancelling (NC) algorithm;
- a wind noise cancelling (WNC) algorithm;
- a reverberation cancelling (RevC) algorithm;
- a feedback cancelling (FC) algorithm;
- a speech enhancement (SE) algorithm;
- an impulse noise cancelling (INC) algorithm;
- a acoustic object separation (AOS) algorithm;
- a binaural synchronization (BS) algorithm; and
- a beamforming (BF) algorithm, in particular adapted for static and/or adaptive beamforming.

In some implementations, before said comparing of the input audio signal and the processed audio signal, at least one statistical metrics is determined from the input audio signal and the processed audio signal, wherein, during said comparing of the input audio signal and the processed audio signal, the statistical metrics of the input audio signal is compared with the statistical metrics of the processed audio signal.

In some implementations, the statistical metrics comprises at least one of a level histogram; a variance; a kurtosis; an envelope of a sub-band; and a modulation transfer function (MTF).

In some implementations, depending on the comparison, e.g., of the at least one statistical metrics, at least one of a noise cancelling (NC) algorithm, noise cleaning algorithm, and a beamforming (BF) algorithm is selected.

In some implementations, the method further comprises
- evaluating, before said comparing of the input audio signal and the processed audio signal, the input audio signal in a psychoacoustic model of a hearing perception of a person without a hearing loss;

evaluating, before said comparing of the input audio signal and the processed audio signal, the processed audio signal in a psychoacoustic model of a hearing perception of an individual hearing loss of the user;

determining, from said evaluated input audio signal and said evaluated processed audio signal in the respective psychoacoustic model, said at least one deviation characteristic.

In some implementations, a desired outcome of said processing of the input audio signal comprises an amplification and/or audibility and/or loudness of the input audio signal which is required for a hearing restoration of the individual hearing loss of the user.

In some implementations, depending on the deviation characteristic, e.g., as determined from said evaluated input audio signal and said evaluated processed audio signal in the respective psychoacoustic model, at least one of a gain model (GM), a gain compression (GC) algorithm, and a frequency compression (FC) algorithm is selected.

In some implementations, the method further comprises evaluating, before said comparing of the input audio signal and the processed audio signal, the input audio signal with regard to spatial cues indicative of a difference of a sound detected on a different position at the user and/or binaural cues indicative of a difference of a sound detected at a left and a right ear of the user;

evaluating, before said comparing of the input audio signal and the processed audio signal, the processed audio signal with regard to said spatial and/or binaural cues;

determining, from said evaluating of the input audio signal and the processed audio signal with regard to said spatial and/or binaural cues, said at least one deviation characteristic.

In some implementations, said spatial and/or binaural cues comprise at least one of a time difference (TD) indicative of a difference of a time of arrival of the sound detected at the different positions and/or at the left and right ear of the user;

a level difference (LD) indicative of a difference of an intensity of the sound detected at the different positions and/or at the left and right ear of the user;

an envelope difference (ED) indicative of a difference of an envelope of a sub-band of the sound detected at the different positions and/or at the left and right ear of the user; and a coherence (C) indicative of a coherence of the sound detected at the different positions and/or at the left and right ear of the user.

In some implementations, the desired outcome of said processing of the input audio signal comprises a preservation of said spatial and/or binaural cues in the processed audio signal.

In some implementations, depending on the deviation characteristic, e.g., as determined from said from said evaluating of the input audio signal and the processed audio signal with regard to said spatial and/or binaural cues, at least one of a binaural synchronization (BS) algorithm, and a beamforming (BF) algorithm is selected.

In some implementations, the method further comprises determining, during said comparing of the input audio signal and the processed audio signal, a correlation between the input audio signal and the processed audio signal, wherein the deviation characteristic is indicative of an amount and/or an absence of said correlation; and/or determining, during said comparing of the input audio signal and the processed audio signal, an amount of a temporal dispersion of an impulse in the processed audio signal relative to the amount of temporal dispersion of the impulse in the input audio signal, wherein the deviation characteristic is indicative of an amount of said temporal dispersion.

In some implementations, the temporal dispersion of the impulse is determined at an onset which is present in the input audio signal and the processed audio signal, e.g., an onset of a speech content.

In some implementations, depending on the deviation characteristic, e.g., as determined from said correlation between the input audio signal and the processed audio signal and/or from said amount of temporal dispersion, at least one of a feedback cancelling (FC) algorithm, a gain model (GM), and a gain compression (GC) algorithm is selected.

In some implementations, said comparing of the input audio signal and the processed audio signal is performed in a time domain. In some implementations, the input audio signal and the processed audio signal are temporally aligned before said comparing.

In some implementations, the method further comprises classifying the input audio signal and the processed audio signal by attributing at least one class from a plurality of predetermined classes to the input audio signal and the processed audio signal, wherein said deviation measure is indicative of whether a different class has been attributed to the input audio signal and the processed audio signal.

In some implementations, before the receiving of the input audio signal, the input audio signal is converted from an analog signal into a digital signal.

In some implementations, before the comparing of the input audio signal and the processed audio signal, the processed audio signal is converted from a digital signal into an analog signal.

In some implementations, the processed audio signal can be provided by a processor included in the hearing device after said processing of the audio signal. In some implementations, the processed audio signal can be provided by a an in-the-ear input transducer, e.g., an ear canal microphone, configured to detect sound inside the ear canal and to provide an in-the-ear audio signal indicative of the detected sound, wherein the processed audio signal is provided as the in-the-ear audio signal.

FIG. 1 illustrates an exemplary hearing device 110 configured to be worn at an ear of a user. Hearing device 110 may be implemented by any type of hearing device configured to enable or enhance hearing or a listening experience of a user wearing hearing device 110. For example, hearing device 110 may be implemented by a hearing aid configured to provide an amplified version of audio content to a user, a sound processor included in a cochlear implant system configured to provide electrical stimulation representative of audio content to a user, a sound processor included in a bimodal hearing system configured to provide both amplification and electrical stimulation representative of audio content to a user, or any other suitable hearing prosthesis, or an earbud or an earphone or a hearable.

Different types of hearing device 110 can also be distinguished by the position at which they are worn at the ear. Some hearing devices, such as behind-the-ear (BTE) hearing aids and receiver-in-the-canal (RIC) hearing aids, typically comprise an earpiece configured to be at least partially inserted into an ear canal of the ear, and an additional housing configured to be worn at a wearing position outside the ear canal, in particular behind the ear of the user. Some other hearing devices, as for instance earbuds, earphones, hearables, in-the-ear (ITE) hearing aids, invisible-in-the-canal (IIC) hearing aids, and completely-in-the-canal (CIC) hearing aids, commonly comprise such an earpiece to be worn at least partially inside the ear canal without an additional housing for wearing at the different ear position.

As shown, hearing device 110 includes a processor 112 communicatively coupled to a memory 113, an audio input unit 114, and an output transducer 117. Audio input unit 114 may comprise at least one input transducer 115 and/or an audio signal receiver 116 configured to provide an input audio signal. Hearing device 110 may further include a communication port 119. Hearing device 110 may further include a sensor unit 118 communicatively coupled to processor 112. Hearing device 110 may include additional or alternative components as may serve a particular implementation. Input transducer 115 may be implemented by any suitable device configured to detect sound in the environment of the user and to provide an input audio signal indicative of the detected sound, e.g., a microphone or a microphone array. Output transducer 117 may be implemented by any suitable audio transducer configured to output an output audio signal to the user, for instance a receiver of a hearing aid, an output electrode of a cochlear implant system, or a loudspeaker of an earbud.

Processor 112 is configured to receive, from input transducer 115, an input audio signal indicative of a sound detected in the environment of the user; to process the input audio signal by a plurality of audio processing algorithms executed in a sequence and/or in parallel to generate a processed audio signal, wherein the processed audio signal is provided to output transducer 117 so as to generate an output audio signal based on the processed audio signal so as to stimulate the user's hearing. Processor 112 is further configured to compare the input audio signal and the processed audio signal; to select, depending on the comparison, at least one of the audio processing algorithms; and to control the selected audio processing algorithm to adjust the processing of the input audio signal. These and other operations, which may be performed by processor 112, are described in more detail in the description that follows.

Memory 113 may be implemented by any suitable type of storage medium and is configured to maintain, e.g. store, data controlled by processor 112, in particular data generated, accessed, modified and/or otherwise used by processor 112. For example, memory 113 may be configured to store instructions used by processor 112 to process the input audio signal received from input transducer 115, e.g., audio processing instructions in the form of one or more audio processing algorithms. The audio processing algorithms may comprise different audio processing instructions of processing the input audio signal received from input transducer 115. For instance, the audio processing algorithms may provide for at least one of a gain model (GM) defining an amplification characteristic, a noise cancelling (NC) algorithm, a wind noise cancelling (WNC) algorithm, a reverberation cancelling (RevC) algorithm, a feedback cancelling (FC) algorithm, a speech enhancement (SE) algorithm, a gain compression (GC) algorithm, a noise cleaning algorithm, a binaural synchronization (BS) algorithm, a beamforming (BF) algorithm, in particular static and/or adaptive beamforming, and/or the like. A plurality of the audio processing algorithms may be executed by processor 112 in a sequence and/or in parallel to generate a processed audio signal Memory 113 may comprise a non-volatile memory from which the maintained data may be retrieved even after having been power cycled, for instance a flash memory and/or a read only memory (ROM) chip such as an electrically erasable programmable ROM (EEPROM). A non-transitory computer-readable medium may thus be implemented by memory 113. Memory 113 may further comprise a volatile memory, for instance a static or dynamic random access memory (RAM).

As illustrated, hearing device 110 may further comprise an audio signal receiver 116. Audio signal receiver 116 may be implemented by any suitable data receiver and/or data transducer configured to receive an input audio signal from a remote audio source. For instance, the remote audio source may be a wireless microphone, such as a table microphone, a clip-on microphone and/or the like, and/or a portable device, such as a smartphone, smartwatch, tablet and/or the like, and/or any another data transceiver configured to transmit the input audio signal to audio signal receiver 116. E.g., the remote audio source may be a streaming source configured for streaming the input audio signal to audio signal receiver 116. Audio signal receiver 116 may be configured for wired and/or wireless data reception of the input audio signal. For instance, the input audio signal may be received in accordance with a Bluetooth™ protocol and/or by any other type of radio frequency (RF) communication.

As illustrated, hearing device 110 may further comprise a communication port 119. Communication port 119 may be implemented by any suitable data transmitter and/or data receiver and/or data transducer configured to exchange data with another device. For instance, the other device may be another hearing device configured to be worn at the other ear of the user than hearing device 110 and/or a communication device such as a smartphone, smartwatch, tablet and/or the like. Communication port 119 may be configured for wired and/or wireless data communication. For instance, data may be communicated in accordance with a Bluetooth™ protocol and/or by any other type of radio frequency (RF) communication.

As illustrated, hearing device 110 may comprise a sensor unit 118 comprising at least one further sensor communicatively coupled to processor 112 in addition to input transducer 115. Some examples of a sensor which may be implemented in sensor unit 118 are illustrated in FIG. 2.

Figure 2:
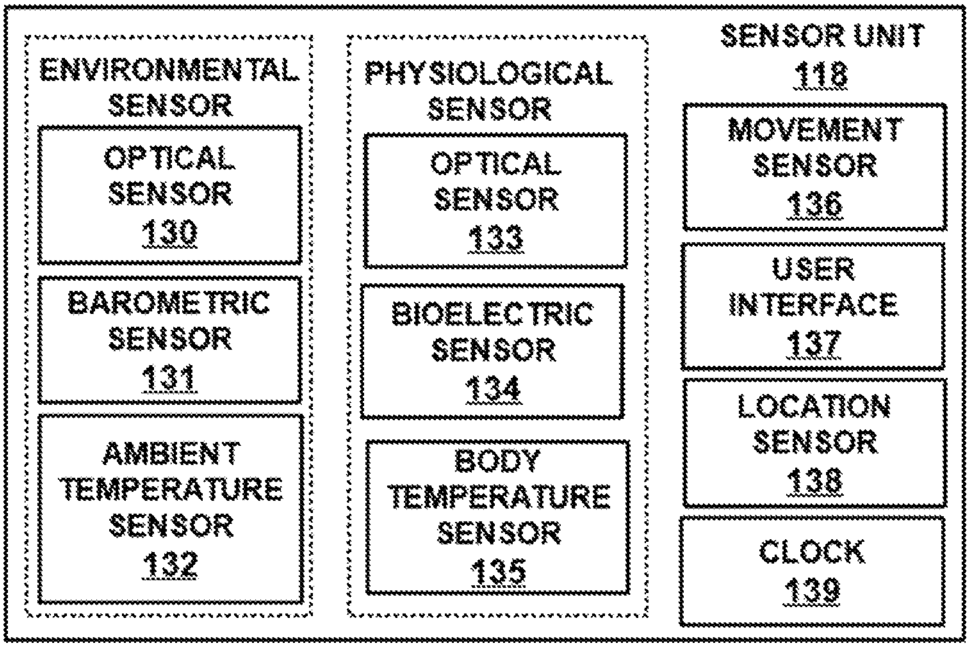
FIG. 2 schematically illustrates an exemplary sensor unit comprising one or more sensors which may be implemented in the hearing device illustrated in FIG. 1.

As illustrated in FIG. 2, sensor unit 118 may include at least one environmental sensor configured to provide environmental data indicative of a property of the environment of the user in addition to input transducer 115, for example an optical sensor 130 configured to detect light in the environment and/or a barometric sensor 131 and/or an ambient temperature sensor 132. Sensor unit 120 may include at least one physiological sensor configured to provide physiological data indicative of a physiological property of the user, for example an optical sensor 133 and/or a bioelectric sensor 134 and/or a body temperature sensor 135. Optical sensor 133 may be configured to emit the light at a wavelength absorbable by an analyte contained in blood such that the physiological sensor data comprises information about the blood flowing through tissue at the ear. E.g., optical sensor 133 can be configured as a photoplethysmography (PPG) sensor such that the physiological sensor data comprises PPG data, e.g. a PPG waveform. Bioelectric sensor 134 may be implemented as a skin impedance sensor and/or an electrocardiogram (ECG) sensor and/or an electroencephalogram (EEG) sensor and/or an electrooculography (EOG) sensor.

Sensor unit 120 may include a movement sensor 136 configured to provide movement data indicative of a movement of the user, for example an accelerometer and/or a gyroscope and/or a magnetometer. Sensor unit 120 may include a user interface 137 configured to provide interaction data indicative of an interaction of the user with hearing device 110, e.g., a touch sensor and/or a push button. Sensor unit 120 may include at least one location sensor 138 configured to provide location data indicative of a current location of the user, for instance a GPS sensor. Sensor unit 120 may include at least one clock 139 configured to provide time data indicative of a current time. Context data may be defined as data indicative of a local and/or temporal context of the data provided by other sensors 115, 131-137. Context data may comprise the location data and/or the time data provided by location sensor 138 and/or clock 139. Context data may also be received from an external device via communication port 119, e.g., from a communication device. E.g., one or more of sensors 115, 131-137 may then be included in the communication device. Sensor unit 120 may include further sensors providing sensor data indicative of a property of the user and/or the environment and/or the context.

Figure 3:
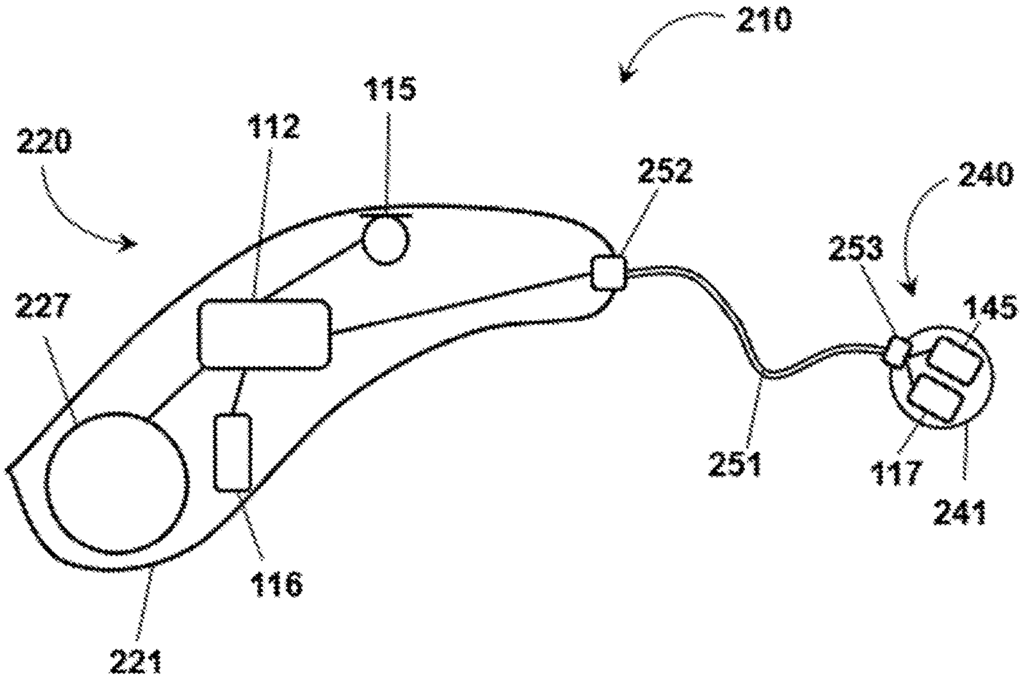
FIG. 3 schematically illustrates an embodiment of the hearing device illustrated in FIG. 1 as a RIC hearing aid.

FIG. 3 illustrates an exemplary implementation of hearing device 110 as a RIC hearing aid 210. RIC hearing aid 210 comprises a BTE part 220 configured to be worn at an ear at a wearing position behind the ear, and an ITE part 240 configured to be worn at the ear at a wearing position at least partially inside an ear canal of the ear. BTE part 220 comprises a BTE housing 221 configured to be worn behind the ear. BTE housing 221 accommodates processor 112 communicatively coupled to input transducer 115 and audio signal receiver 116. BTE part 220 further includes a battery 227 as a power source. ITE part 240 is an earpiece comprising an ITE housing 241 at least partially insertable in the ear canal. ITE housing 241 accommodates output transducer 117. ITE part 240 may further include an in-the-ear input transducer 145, e.g., an ear canal microphone, configured to detect sound inside the ear canal and to provide an in-the-ear audio signal indicative of the detected sound. BTE part 220 and ITE part 240 are interconnected by a cable 251. Processor 112 is communicatively coupled to output transducer 117 and to in-the-ear input transducer 145 of ITE part 240 via cable 251 and cable connectors 252, 253 provided at BTE housing 221 and ITE housing 241. In some implementations, at least one of sensors 130-139 is included in BTE part 220 and/or ITE part 240.

Figure 4:
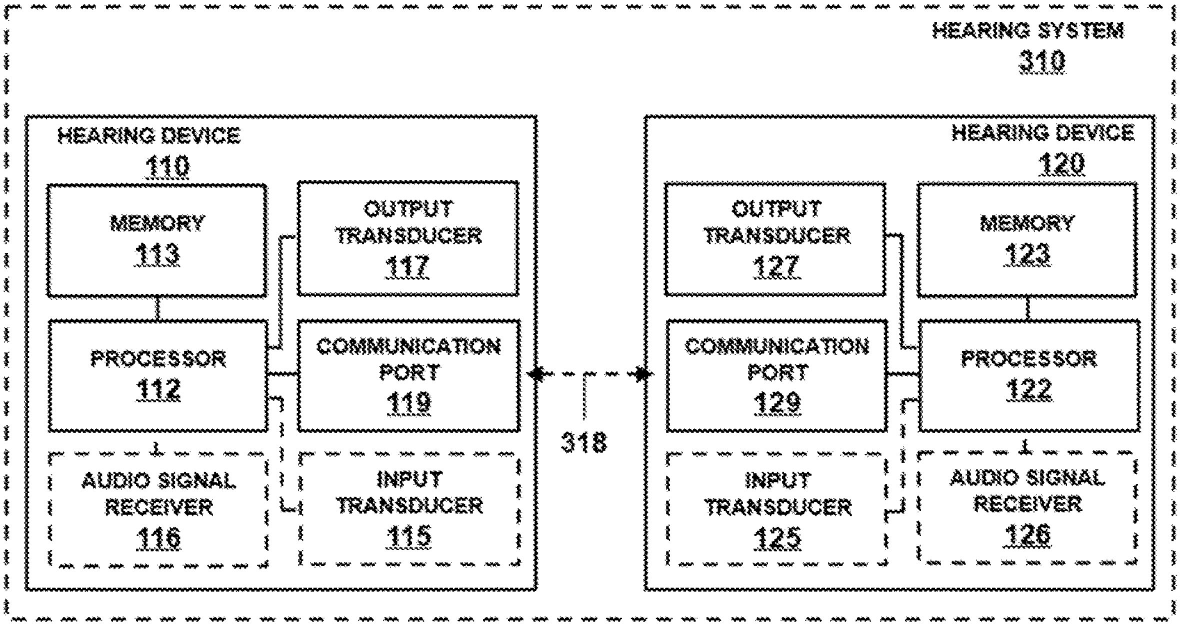
FIG. 4 schematically illustrates an exemplary hearing system comprising a first and second hearing device configured to be worn at different ears of the user.

FIG. 4 illustrates an exemplary hearing system 310 comprising first hearing device 110 configured to be worn at a first ear of the user, and a second hearing device 120 configured to be worn at a second ear of the user. Hearing system 310 may also be denoted as a binaural hearing device. Second hearing device 120 may be implemented corresponding to first hearing device 110. As shown, second hearing device 120 includes a processor 122 communicatively coupled to a memory 123, an output transducer 127, and an audio input unit, which may comprise at least one input transducer 125 and/or an audio signal receiver 126. First hearing device 110 and/or second hearing device 120 may further include sensor unit 118 communicatively coupled to processor 112. Hearing device 120 further includes a communication port 119. Processor 112 of first hearing device 110 and processor 122 of second hearing device 120 are communicatively coupled by communication ports 119, 129 via a communication link 318. A processing unit may comprise processors 112, 122, which may form a distributed processing system and/or may operate in a master-slave configuration. Hearing system 310 may further comprise a portable device, e.g., a communication device such as a smartphone, smartwatch, tablet and/or the like. The portable device, in particular a processor included in the portable device, may also be communicatively coupled to processors 112, 122, e.g., via communication ports 119, 129.

Figure 5:
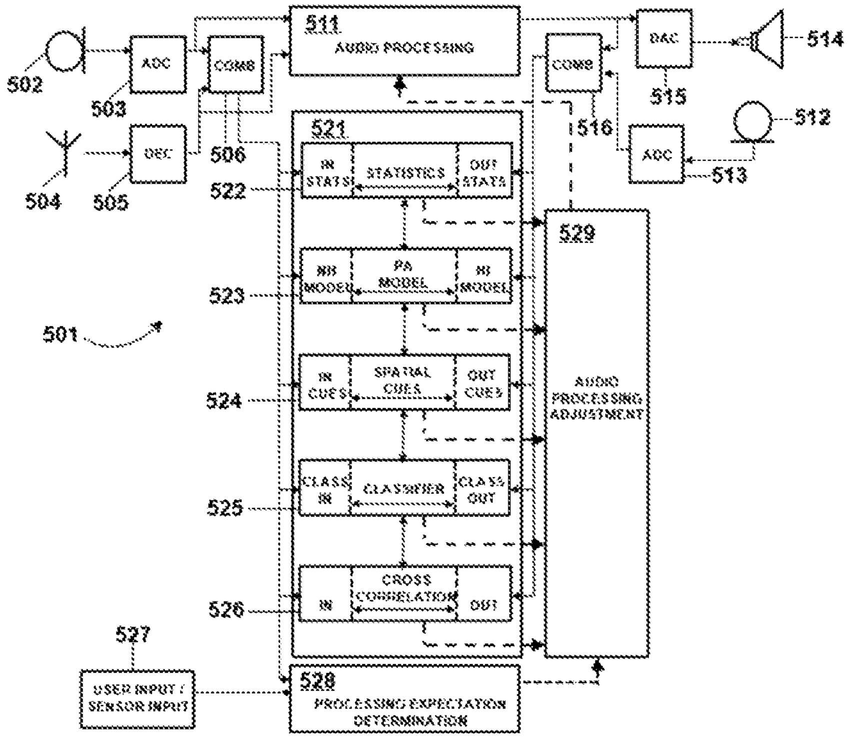
FIGS. 5-6 schematically illustrate exemplary arrangements for optimizing audio processing in a hearing device.

FIG. 5 illustrates a functional block diagram of an exemplary audio signal processing arrangement 501 that may be implemented by hearing device 110 and/or hearing system 310. Arrangement 501 comprises at least one input transducer 502, which may be implemented by input transducer 115, 125, and/or at least one audio signal receiver 504, which may be implemented by audio signal receiver 115, 125. The input audio signal provided by input transducer 115, 125, 502 may be an analog signal. The analog signal may be converted into a digital signal by an analog-to-digital converter (ADC) 503. The input audio signal provided by audio signal receiver 504 may be an encoded signal. The encoded signal may be decoded into a decoded signal by a decoder (DEC) 505. Arrangement 501 further comprises at least one output transducer 514, which may be implemented by output transducer 117, 127. Arrangement 501 may further comprise at least one in-the-ear input transducer 512, which may be implemented by in-the-ear input transducer 145, configured to provide an in-the-ear audio signal indicative of sound detected inside the ear canal. The in-the-ear audio signal may be an analog signal, which may be converted into a digital signal by an analog-to-digital converter (ADC) 513. Arrangement 501 may further comprise at least one user input and/or sensor input unit 527, which may be implemented by user interface 137 and/or at least one of sensors 130-136, 138, 139 included in sensor unit 118.

Arrangement 501 further comprises an audio processing module 511, an audio input-output comparison module 521, an audio processing expectation determination module 528, and an audio processing adjustment module 529. Modules 511, 521, 528, 529 may be executed by at least one processor 112, 122, e.g., by a processing unit including processor 112 of first hearing device 110 and/or processor 122 of second hearing device 120. As illustrated, the input audio signal provided by input transducer 115, 125, 502, after it has been converted into a digital signal by analog-to-digital converter 503, and/or the input audio signal provided by audio signal receiver 504, after it has been decoded by decoder 505, can be received by audio processing module 511. Audio processing module 511 is configured to process the input audio signal by a plurality of audio processing algorithms executed in a sequence and/or in parallel to generate a processed audio signal. Based on the processed audio signal, an output audio signal can be output by output transducer 514 so as to stimulate the user's hearing. To this end, the processed audio signal may be converted into an analog signal by a digital-to-analog converter (DAC) 515 before providing the processed audio signal to output transducer 514.

The input audio signal provided by input transducer 115, 125, 502 after it has been converted into a digital signal by analog-to-digital converter 503, and/or the input audio signal provided by audio signal receiver 504, after it has been decoded by decoder 505, can also be received by audio input-output comparison module 521. As illustrated, when a first input audio signal is provided by input transducer 115, 125, 502 and a second input audio signal is provided by audio signal receiver 504, the first and second input audio signal may be combined to a combined input audio signal by a combiner (COMB) 506. Thus, the input audio signal provided by input transducer 115, 125, 502 and/or the input audio signal provided by audio signal receiver 504 or the combined input audio signal may be received by audio input-output comparison module 521. Further, the processed audio signal provided by audio processing module 511 after applying the plurality of audio processing algorithms to the input audio signal can be received by input-output comparison module 521, in particular before the processed audio signal is converted into an analog signal by digital-to-analog converter 515. Additionally or alternatively, the in-the-ear audio signal provided by in-the-ear input transducer 514, after it has been converted into a digital signal by an analog-to-digital converter (ADC) 513, can be received by input-output comparison module 521. In particular, the in-the-ear audio signal may be indicative of the output audio signal output by output transducer 514 which is based on the processed audio signal. Therefore, the in-the-ear audio signal may also be denoted as a processed audio signal. In some implementations, the processed audio signal provided by audio processing module 511 and the processed audio signal provided by in-the-ear input transducer 512 may be combined into a combined processed audio signal by a combiner (COMB) 516. Thus, the processed audio signal provided by audio processing module 511, or the processed audio signal provided by in-the-ear input transducer 512, after it has been converted into a digital signal by analog-to-digital converter 513, or the combined processed audio signal may be received by audio input-output comparison module 521.

Audio input-output comparison module 521 is configured to compare the received input audio signal and the received processed audio signal to determine at least one deviation characteristic indicative of a deviation of the processed audio signal from the input audio signal. In some implementations, before the comparing of the input audio signal and the processed audio signal, audio input-output comparison module 521 can be configured to perform a temporal alignment of the input audio signal and the processed audio signal, e.g., to compensate for a delay caused by the processing of the input audio signal by the plurality of audio processing algorithms. In some instances, the delay caused by the signal processing is previously known and/or can be predicted such that the temporal alignment can be carried out by temporally shifting the input audio signal or the processed audio signal by the delay. In some instances, the input audio signal may be provided with a time stamp indicative of a current time which is also present in the processed audio signal, wherein the temporal alignment can be carried out by temporally aligning the input audio signal and the processed audio signal relative to the time stamp.

In some implementations, after the comparing of the input audio signal and the processed audio signal, audio input-output comparison module 521 can be configured to compare again the received input audio signal and the received processed audio signal to repeat the determining of the at least one deviation characteristic. In particular, the input audio signal and the processed audio signal may be received by audio input-output comparison module 521 at a first time for which the comparison is carried out at a first time, and the input audio signal and the processed audio signal may be received by audio input-output comparison module 521 at a second time, for which the comparison is carried out again for a second time for the repeated determining of the at least one deviation characteristic. The input audio signal repeatedly received by audio input-output comparison module 521, e.g., at the first time and the second time, may correspond to an input audio signal repeatedly provided by input transducer 115, 125, 502, 125, 502, e.g., corresponding to a repeatedly detected sound in the environment of the user, and/or repeatedly provided by audio signal receiver 116, 126, 504, e.g., corresponding to a repeatedly received input audio signal. The processed audio signal repeatedly received by audio input-output comparison module 521, e.g., at the first time and the second time, may correspond to a processed audio signal repeatedly provided by audio processing module 511, e.g., corresponding to a repeatedly processed input audio signal repeatedly provided by input transducer 115, 125, 502 and/or repeatedly provided by audio signal receiver 116, 126, 504, and/or to a processed audio signal repeatedly provided by in-the-ear input transducer 145, 512, e.g., corresponding to a repeatedly detected in-the-ear audio signal.

In some instances, audio input-output comparison module 521 can be configured to continuously compare the input audio signal and the processed audio signal to continuously determine the at least one deviation characteristic. The input audio signal and the processed audio signal may then be continuously received by audio input-output comparison module 521, and the comparison can be carried out in a continuous manner. For instance, the input audio signal may be continuously provided by input transducer 115, 125, 502, e.g., corresponding to a continuously detected sound in the environment of the user, and/or continuously provided by audio signal receiver 116, 126, 504, e.g., corresponding to a continuously received input audio signal. The processed audio signal may be continuously received from audio processing module 511, e.g., corresponding to a continuously processed input audio signal continuously provided by input transducer 115, 125, 502 and/or continuously provided by audio signal receiver 116, 126, 504, and/or to a processed audio signal continuously provided by in-the-ear input transducer 145, 512, e.g., corresponding to a continuously detected in-the-ear audio signal.

The input audio signal provided by input transducer 115, 125, 502, after it has been converted into a digital signal by analog-to-digital converter 503, and/or the input audio signal provided by audio signal receiver 504, after it has been decoded by decoder 505, may also be received by audio processing expectation determination module 528. In particular, the input audio signal provided by input transducer 115, 125, 502 and/or the input audio signal provided by audio signal receiver 504 or the combined input audio signal may be received by audio processing expectation determination module 528. Additionally or alternatively, user input data and/or sensor data provided by sensor input unit 527 may be received by audio processing expectation determination module 528. Audio processing expectation determination module 528 can be configured to provide, e.g., based on the received input audio signal and/or sensor data and/or user input data received from sensor input unit 527, an expectation measure indicative of an expected deviation of the processed audio signal from the input audio signal corresponding to a desired outcome of said processing of the input audio signal.

Some examples of the desired outcome of said processing of the input audio signal comprise an enhancement of a speech content of a single talker in the input audio signal and/or an enhancement of a speech content of a plurality of talkers in the input audio signal and/or a reproduction of sound emitted by an acoustic object in the environment of the user and/or a reproduction of sound emitted by a plurality of acoustic objects in the environment of the user and/or a reduction and/or cancelling of noise and/or reverberations in the input audio signal and/or a preservation of acoustic cues contained in the input audio signal and/or a suppression of noise in the input audio signal and/or an improvement of a signal to noise ratio (SNR) in the input audio signal and/or a spatial resolution of sound encoded in the input audio signal depending on a direction of arrival (DOA) of the sound and/or depending on a location of at least one acoustic object emitting the sound in the environment of the user, wherein the acoustic object may be moving relative to the user, and/or a directivity of an audio content in the input audio signal provided by a beamforming or a preservation of an omnidirectional audio content in the input audio signal and/or an amplification of sound encoded in the input audio signal adapted to an individual hearing loss of the user and/or an enhancement of music content in the input audio signal.

To illustrate, at least one of the received input audio signal, sensor data, and user input data can be indicative of a signal processing goal to be fulfilled by the plurality of audio processing algorithms executed in a sequence and/or in parallel. Audio processing expectation determination module 528 can then be configured to determine from the received input audio signal and/or sensor data and/or user input data the expectation measure in accordance with the signal processing goal. In particular, the desired outcome of said processing of the input audio signal may be determined by audio processing expectation determination module 528 based on at least one of the input audio signal, movement data provided by movement sensor 136, physiological data provided by physiological sensor 133, 134, 135, environmental data provided by environmental sensor 130, 131, 132; user input data entered via user interface 137, and location data and/or time data which may be provided by location sensor 138 and/or clock 139. For instance, the signal processing goal may depend on a known or selected or predicted user intention and/or listening goal and/or classification of a current acoustic scene.

In a case in which the signal processing goal is previously known, a desired outcome of said processing of the input audio signal, in particular the signal processing goal, may be at least partially predetermined and/or fixed. The expectation measure corresponding to the desired outcome of said processing of the input audio signal may then be at least partially determined by audio processing expectation determination module 528 independently from the input audio signal and/or sensor data and/or user input data. E.g., when the hearing device is configured to compensate for an individual hearing loss of the user, the desired outcome of the processing of the input audio signal may be a gain and/or amplification of the input audio signal suitable to compensate for the individual hearing loss. In such a case, the expectation measure provided by audio processing expectation determination module 528 may at least partially correspond to an expected deviation of the processed audio signal from the input audio signal which is required to compensate for the individual hearing loss. In particular, as further described below, the input audio signal may be evaluated in a psychoacoustic model of a hearing perception of a person without a hearing loss and the processed audio signal may be evaluated in a psychoacoustic model of the hearing perception of the individual hearing loss of the user before the deviation characteristic is determined by audio input-output comparison module 521. The expectation measure provided by audio processing expectation determination module 528 may then be representative for an expected deviation between the evaluated input audio signal and the evaluated processed audio signal which is required to compensate for the individual hearing loss.

In a case in which the signal processing goal can be selected by the user, a desired outcome of said processing of the input audio signal, in particular the signal processing goal, may be entered by the user via user interface 137. The expectation measure corresponding to the desired outcome of said processing of the input audio signal may then be at least partially determined by audio processing expectation determination module 528 depending on the user input data. E.g., in the user input data, the user may indicate a desired outcome of the processing of the input audio signal according to any of the examples described above. In such a case, the expectation measure provided by audio processing expectation determination module 528 may at least partially correspond to an expected deviation of the processed audio signal from the input audio signal which is required to meet the desired outcome of the processing of the input audio signal. As another example, the user input data may be indicative of, after a processing of the input audio signal has been adjusted by audio processing adjustment module 529, whether the user prefers the processed audio signal which has been processed before the adjustment or the processed audio signal which has been processed after the adjustment. In a case in which the user prefers the processed audio signal which has been processed before the adjustment, the processing of the input audio signal may be set back according to the setting before the adjustment.

In a case in which the signal processing goal can be automatically predicted, the prediction may be based on the received input audio signal and/or sensor data. In a case in which the prediction is based on the received input audio signal, audio processing expectation determination module 528 may comprise a classifier configured to classify the input audio signal by attributing at least one class from a plurality of predetermined classes to the input audio signal, wherein said desired outcome of said processing of the input audio signal is determined depending on the class attributed to the input audio signal. Exemplary classes may include, but are not limited to, low ambient noise, high ambient noise, traffic noise, music, machine noise, babble noise, public area noise, background noise, speech, nonspeech, speech in quiet, speech in babble, speech in noise, speech from the user, speech from a significant other, background speech, speech from multiple sources, quiet indoor, quiet outdoor, speech in a car, speech in traffic, speech in a reverberating environment, speech in wind noise, speech in a lounge, car noise, applause, music, e.g. classical music, and/or the like. In some instances, different audio processing algorithms can be associated with different classes. In such a case, the processing of the input audio signal may be performed by applying at least one audio processing algorithm associated with the at least one class attributed to the audio signal which may be included in the plurality of the audio processing algorithms which are executed in a sequence and/or in parallel to generate the processed audio signal.

In some instances, a desired outcome of said processing of the input audio signal, in particular the signal processing goal, can be associated with each of the different classes. In such a case, the expectation measure provided by audio processing expectation determination module 528 may at least partially correspond to an expected deviation of the processed audio signal from the input audio signal which is required to meet the desired outcome of the processing of the input audio signal associated with the at least one class attributed to the input audio signal. In some instances, different audio processing algorithms can be associated with different classes. In such a case, the processing of the input audio signal may be performed by applying at least one audio processing algorithm associated with the at least one class attributed to the audio signal by audio processing module 511 which may be included in the plurality of the audio processing algorithms which are executed in a sequence and/or in parallel to generate the processed audio signal.

In a case in which the prediction is based on movement data provided by movement sensor 136, audio processing expectation determination module 528 may determine, based on the movement data, the expectation measure corresponding to the desired outcome of said processing of the input audio signal. To illustrate, when the movement data indicates a situation in which the user is walking or running, a desired outcome of said processing of the input audio signal may be a preservation of an omnidirectional audio content in the input audio signal or a directivity of an audio content in the input audio signal corresponding to a looking direction of the user which may be provided by a beamforming algorithm. In such a case, the expectation measure provided by audio processing expectation determination module 528 may at least partially correspond to an expected deviation of the processed audio signal from the input audio signal which is required to meet the desired directivity of the audio content in the processed audio signal. As another example, when the movement data indicates a situation in which the user is standing still or sitting, a desired outcome of said processing of the input audio signal may be a spatial resolution of sound encoded in the input audio signal depending on a direction of arrival (DOA) of the sound and/or depending on a location of at least one acoustic object emitting the sound in the environment of the user. In such a case, the expectation measure provided by audio processing expectation determination module 528 may at least partially correspond to an expected deviation of the processed audio signal from the input audio signal which is required to meet the desired spatial resolution of sound encoded in the processed audio signal.

In some implementations, movement data provided by movement sensor 136 may be attributed to at least one class from a plurality of predetermined classes, as described above, wherein the desired outcome of said processing of the input audio signal is determined depending on the class attributed to the movement data. In particular, when a desired outcome of said processing of the input audio signal is associated with each of the different classes, the expectation measure provided by audio processing expectation determination module 528 may at least partially correspond to an expected deviation of the processed audio signal from the input audio signal which is required to meet the desired outcome of the processing of the input audio signal associated with the at least one class attributed to the movement data.

In a case in which the prediction is based on environmental data provided by environmental sensor 130, 131, 132, audio processing expectation determination module 528 may determine, based on the environmental data, the expectation measure corresponding to the desired outcome of said processing of the input audio signal. To illustrate, when the optical data provided by optical sensor 130 indicates bad visual conditions, e.g., during night, and/or the barometric data provided by barometric sensor 131 and/or the ambient temperature data provided by temperature sensor 132 indicate a bad weather situation, a desired outcome of said processing of the input audio signal may be a preservation of an omnidirectional audio content in the input audio signal or a directivity of an audio content in the input audio signal corresponding to a looking direction of the user, which may be provided by a beamforming algorithm, e.g., to facilitate a spatial orientation for the user in the bad visual conditions. In such a case, the expectation measure provided by audio processing expectation determination module 528 may at least partially correspond to an expected deviation of the processed audio signal from the input audio signal which is required to meet the desired directivity of the audio content in the input audio signal corresponding to the looking direction of the user.

In a case in which the prediction is based on physiological data provided by physiological sensor 133, 134, 135, audio processing expectation determination module 528 may determine, based on the physiological data, the expectation measure corresponding to the desired outcome of said processing of the input audio signal. To illustrate, when the optical data provided by optical sensor 133 and/or the bioelectrical data provided by bioelectric sensor 134 and/or the temperature data provided by body temperature sensor 134 indicates a medical emergency of the user, a desired outcome of said processing of the input audio signal may be an enhancement of a speech content of a single talker and/or a plurality of talkers in the input audio signal, e.g., to facilitate a communication of the user with medical assistance. In such a case, the expectation measure provided by audio processing expectation determination module 528 may at least partially correspond to an expected deviation of the processed audio signal from the input audio signal which is required to meet the desired speech enhancement in the processed audio signal. As another example, when the physiological data provided by physiological sensor 133, 134, 135 and/or the movement data provided by movement sensor 136 indicate that the user is involved in a sports activity, e.g., when the user is moving with an increased heart rate, a desired outcome of said processing of the input audio signal may also be a preservation of an omnidirectional audio content in the input audio signal or a directivity of an audio content in the input audio signal corresponding to a looking direction of the user. In such a case, the expectation measure provided by audio processing expectation determination module 528 may at least partially correspond to an expected deviation of the processed audio signal from the input audio signal which is required to meet the desired directivity of the audio content in the input audio signal corresponding to the looking direction of the user.

Audio processing adjustment module 529 can be configured to select, depending on the at least one deviation characteristic determined by audio input-output comparison module 521, at least one of the audio processing algorithms which are executed by audio processing module 511 in a sequence and/or in parallel to generate the processed audio signal. Furthermore, audio processing adjustment module 529 can control the selected audio processing algorithm to adjust the processing of the input audio signal. In some instances, when the expectation measure indicative of an expected deviation of the processed audio signal from the input audio signal has been determined by audio processing expectation determination module 528, audio processing adjustment module 529 can be configured to determine whether the at least one deviation characteristic matches the expectation measure, wherein the selecting of the audio processing algorithm and the controlling of the selected audio processing algorithm is performed in a case in which a mismatch between said deviation characteristic and the expectation measure has been determined. In particular, depending on the known, selected or predicted user intention and/or listening goal and/or scene classification, as provided by audio processing expectation determination module 528, audio processing adjustment module 529 can decide whether the current operative signal processing of the system provided by audio processing module 511 supports the signal processing goal.

Subsequently, two examples for such a decision, which may be performed by audio processing adjustment module 529, are given. In a first example, for any input audio signal composed of multiple acoustic objects, an amount of a co-modulation in an envelope of the processed audio signal may be compared to the amount of co-modulation in the input audio signal by audio input-output comparison module 521. A huge amount of additional co-modulation in the envelope of the processed audio signal is a sign of a reduced statistical independency of the multiple acoustic objects at the input, which is generally not desirable since it is harder for the human listener to disentangle and focus on a single acoustic object. Thus, the expectation measure, as provided by audio processing expectation determination module 528, may correspond to a reduced amount of the co-modulation rather than an increased amount of the co-modulation in the processed audio signal. In a case in which audio processing adjustment module 529 determines that the deviation characteristic determined by audio input-output comparison module 521 matches the expectation measure determined by audio processing expectation determination module 528, i.e., that the amount of co-modulation determined in the envelope of the processed audio signal is reduced relative to the amount of co-modulation in the input audio signal, audio processing adjustment module 529 may decide that the current processing of the input audio signal by the audio processing algorithms is appropriate with regard to the desired outcome of the processing of the input audio signal and may therefore refrain from selecting at least one of the audio processing algorithms and from controlling the selected audio processing algorithm to adjust the processing of the input audio signal. In the contrary case, in which audio processing adjustment module 529 determines a mismatch between the deviation characteristic determined by audio input-output comparison module 521 and the expectation measure determined by audio processing expectation determination module 528, audio processing adjustment module 529 may decide that the current processing of the input audio signal by the audio processing algorithms is not appropriate with regard to the desired outcome of the processing of the input audio signal and may select at least one of the audio processing algorithms to control the selected audio processing algorithm to adjust the processing of the input audio signal.

In a second example, a desired outcome of the processing of the input audio signal may be a single-talker speech enhancement goal, e.g. a talker in a noisy environment. In such a case, at least one statistical metrics from the processed audio signal may be compared with the statistical metrics from the input audio signal by audio input-output comparison module 521. The expectation measure, as provided by audio processing expectation determination module 528, may correspond to the statistical metrics determined in the processed audio signal being more representative of a single talker clean speech signal than to a single talker in a noisy environment as compared to the statistical metrics determined in the input audio signal. E.g., the statistical metrics determined in the input audio signal and the processed audio signal may comprise a kurtosis. The expectation measure, as provided by audio processing expectation determination module 528, may be representative of the kurtosis determined in the processed audio signal being narrower than the kurtosis determined in the input audio signal. In a case in which audio processing adjustment module 529 determines that the deviation characteristic determined by audio input-output comparison module 521 matches the expectation measure determined by audio processing expectation determination module 528, i.e., that the kurtosis determined in the processed audio signal is narrower than the kurtosis determined in the input audio signal, audio processing adjustment module 529 may decide that the current processing of the input audio signal is appropriate with regard to the desired outcome of the processing of the input audio signal, such that the current system performance of the audio processing performed by audio processing module 511 is successful and matches the processing goal. In the contrary case, in which audio processing adjustment module 529 determines a mismatch between the deviation characteristic determined by audio input-output comparison module 521 and the expectation measure determined by audio processing expectation determination module 528, i.e., that the kurtosis determined in the processed audio signal is not narrower than the kurtosis determined in the input audio signal, audio processing adjustment module 529 may decide that the current system performance of the audio processing performed by audio processing module 511 is not appropriate with regard to the desired outcome of the processing of the input audio signal and may select at least one of the audio processing algorithms and control the selected audio processing algorithm to adjust the processing of the input audio signal.

In some implementations, after the controlling of the selected audio processing algorithm by audio processing adjustment module 529 to adjust the processing of the input audio signal, audio input-output comparison module 521 can be configured to compare again the input audio signal and the processed audio signal in order to repeat said determining of the at least one deviation characteristic. Audio processing adjustment module 529 can then be configured to determine whether the repeatedly determined deviation characteristic converges to the expectation measure. In a case in which it is found that the repeatedly determined deviation characteristic diverges from the expectation measure, audio processing adjustment module 529 may be configured to control the selected audio processing algorithm to set back the processing of the input audio signal according to the setting before said adjustment by the predetermined adjustment instructions; and/or to control the selected audio processing algorithm to readjust the processing of the input audio signal differing from the previously applied predetermined adjustment instructions; and/or to select, depending on the deviation characteristic, at least another one of the audio processing algorithms differing from the previously selected audio processing algorithm; and to control the selected other audio processing algorithm to adjust the processing of the input audio signal.

In some instances, when it is found that the repeatedly determined deviation characteristic diverges from the expectation measure, an input from the user may be inquired, e.g., via user interface 137, 527, to demand feedback from the user whether the user prefers the processed audio signal which has been processed before said adjustment by the predetermined adjustment instructions or the processed audio signal which has been processed after said adjustment by the predetermined adjustment instructions by audio processing adjustment module 529. In a case in which the user prefers the processed audio signal which has been processed before said adjustment, audio processing adjustment module 529 may be configured to control the selected audio processing algorithm to set back the processing of the input audio signal according to the setting before said adjustment by the predetermined adjustment instructions. In the contrary case, audio processing adjustment module 529 may be configured to keep the current setting of the audio processing algorithms corresponding to the setting after said adjustment by the predetermined adjustment instructions.

Audio input-output comparison module 521 may comprise at least one of a statistical evaluation module 522, a psychoacoustic evaluation module 523, a spatial cues evaluation module 524, a classification evaluation module 525, and a cross correlation evaluation module 526. Statistical evaluation module 522 can be configured to determine at least one statistical metrics from the input audio signal and the processed audio signal. The statistical metrics may comprise at least one of a level histogram, a variance, a kurtosis, an envelope of a sub-band, and a modulation transfer function (MTF). The statistical metrics of the input audio signal can then be compared with the statistical metrics of the processed audio signal. Based on the comparison, the deviation measure of the input audio signal relative to the processed audio signal can be determined. The one or more statistical metrics may be determined from the input audio signal and the processed audio signal in a broadband and/or sub-band resolution. The one or more statistical metrics may be calculated, e.g., from signal snapshots of the input audio signal and the processed audio signal, in particular within selected time windows of the data, and/or based on sliding window approaches and/or by any other method to derive statistical data from the input audio signal and the processed audio signal.

Psychoacoustic evaluation module 523 can be configured to evaluate, before the comparing of the input audio signal and the processed audio signal, the input audio signal in a psychoacoustic model of a hearing perception of a person without a hearing loss; to evaluate, before the comparing of the input audio signal and the processed audio signal, the processed audio signal in a psychoacoustic model of a hearing perception of an individual hearing loss of the user; and to determine, from the evaluated input audio signal and the evaluated processed audio signal, the at least one deviation characteristic, e.g., by comparing the evaluated input audio signal and the evaluated processed audio signal. In particular, psychoacoustic evaluation module 523 may be employed when a desired outcome of the processing of the input audio signal comprises an amplification and/or audibility and/or loudness of the input audio signal which is required for a hearing restoration of the individual hearing loss of the user. Audio processing expectation determination module 528 may then be configured to determine the expectation measure indicative of the required amplification and/or audibility and/or loudness. This may allow to base the comparison carried out by psychoacoustic evaluation module 523 on a perceptual relevant metric. Further, a success of the chosen signal processing in the system may be evaluated by audio processing adjustment module 529 based on the expectation measure representative for restoring, e.g., audibility and/or loudness of the input audio signal in the processed audio signal with regard to the individual hearing loss of the user. For instance, a degree of a successful audibility and/or loudness restoration may be based on a comparison of signal levels in the input audio signal which lie above the audibility threshold of a normal hearing metric with an individualized audibility and/or loudness metric of signal levels of the processed audio signal. In this regard, a signal processing goal may be defined, e.g., as a predetermined width of a frequency range in which the audibility and/or loudness restoration is successful. The comparison may also be performed on a statistical data analysis of loud and/or uncomfortable loudness levels in the input audio signal and the processed audio signal.

Spatial cues evaluation module 524 can be configured to evaluate, before the comparing of the input audio signal and the processed audio signal, the input audio signal with regard to spatial cues indicative of a difference of a sound detected on a different position at the user and/or binaural cues indicative of a difference of a sound detected on a left and a right ear of the user; to evaluate the processed audio signal with regard to the spatial and/or binaural cues; and to determine, from the evaluating of the input audio signal and the processed audio signal with regard to the spatial and/or binaural cues, the at least one deviation characteristic e.g., by comparing the spatial and/or binaural cues in the input audio signal and the processed audio signal. E.g., the spatial and/or binaural cues can be employed to determine and/or track a current location of an acoustic object in the environment of the user. E.g., the spatial and/or binaural cues may comprise at least one of a time difference (TD) indicative of a difference of a time of arrival of the sound detected at the different positions and/or at the left and right ear of the user; a level difference (LD) indicative of a difference of an intensity of the sound detected at the different positions and/or at the left and right ear of the user; an envelope difference (ED) indicative of a difference of an envelope of a sub-band of the sound detected at the different positions and/or at the left and right ear of the user; and a coherence (C) indicative of a coherence of the sound detected at the different positions and/or at the left and right ear of the user. For instance, a high degree of coherence may indicate that a frequency and/or waveform is identical.

In some instances, when spatial cues are determined, input transducer 115, 125, 502 may be implemented as a microphone array. In some instances, when binaural cues are determined, input transducers 115, 125 of hearing system 310 configured to be worn at the left and right ear of the user may be employed. In particular, spatial cues evaluation module 524 may be employed when a desired outcome of the processing of the input audio signal comprises a preservation of the spatial and/or binaural cues in the processed audio signal. Audio processing expectation determination module 528 may then be configured to determine the expectation measure representative of the preservation of the spatial and/or binaural cues. E.g., when the spatial and/or binaural cues are employed to determine and/or track a current location of an acoustic object in the environment of the user, a preservation of the spatial and/or binaural cues in the processed audio signal may be desirable to determine a current location of an acoustic object and/or to track a trajectory of the acoustic object over time. An evaluation of an amount of spatial and/or binaural cue preservation can be especially relevant in acoustic scenes in which the user should be enabled to localize sound sources for an acoustic orientation, e.g., in traffic situations.

In some implementations, when binaural cues indicative of a difference of a sound detected at a left and a right ear of the user are evaluated by spatial cues evaluation module 524, an exchange of audio data, e.g., of the input audio signal and/or the processed audio signal and/or at least one statistical metric determined from the input audio signal and/or the processed audio signal, e.g., at a time when onsets occur in the input audio signal and/or the processed audio signal, between first hearing device 110 worn at the left ear and second hearing device 120 worn at the right ear may be required, e.g., via communication ports 119, 129. To this end, according to a first implementation, the input audio signal and the processed audio signals obtained by first hearing device 110 and second hearing device 120 may be exchanged and/or transmitted between hearing devices 110, 120 e.g., via communication link 318. Then, processing unit 112, 122 can be configured to calculate an estimation of the binaural cues, e.g., interaural time differences (ITDs), interaural level differences (ILDs), interaural envelope differences (IEDs), interaural coherence (ICs), in the input audio signal and the processed audio signal to quantify the amount of cue preservation. Alternatively, according to a second implementation, the input audio signal obtained at first hearing device 110 may be transmitted to second hearing device 120, and the processed audio signal obtained in second hearing device 120 may be transmitted to first hearing device 110. Processor 122 included in second hearing device 120 may then be configured to calculate an estimation of the binaural cues of the input audio signal obtained at first and second hearing device 110, 120. Processor 112 included in first hearing device 110 may then be configured to calculate an estimation of binaural cues in the processed audio signal obtained in first and second hearing device 110, 120. Then, the binaural cues calculated by processors 112, 120 may be transmitted and/or exchanged between hearing devices 110, 120 to carry out the comparison between the binaural cues in the input audio signal and the processed audio signal.

Cross-correlation evaluation module 526 can be configured to determine, during the comparing of the input audio signal and the processed audio signal, a correlation between a broadband and/or sub-band of the input audio signal and the processed audio signal, wherein the deviation characteristic is indicative of an amount and/or an absence of said correlation; and/or to determine, during the comparing of the input audio signal and the processed audio signal, an amount of a temporal dispersion of an impulse in the processed audio signal relative to the amount of temporal dispersion of the impulse in the input audio signal, wherein the deviation characteristic is indicative of an amount of said temporal dispersion. In some instances, the temporal dispersion of the impulse is determined at an onset which is present in the input audio signal and the processed audio signal, e.g., at an onset of a speech content. In some instances, the comparison may be performed in a time domain. To this end, a temporal alignment between the input audio signal and the processed audio signal may be performed before the comparison, as described above. For example, a presence of a modulation in an envelope of the processed audio signal which would not be present in the envelope of the input audio signal would indicate a low correlation which could be interpreted as a sign of an artificially induced modulation by the audio processing, e.g., as it may occur in a feedback entrainment of a phase-inverting feedback canceller. As another example, in a presence of onsets in the input audio signal and the processed audio signal, a phase information contained in the correlation function could be employed to estimate an amount of a temporal dispersion of impulses. Such information could not be obtained from a windowing-based level histogram analysis, as described above in conjunction with statistical evaluation module 522. An according signal processing goal can be a preserving of the compactness of the impulses in the processed audio signal which can be beneficial for sound localization.

Classification evaluation module 525 can be configured to classify the input audio signal and the processed audio signal by attributing at least one class from a plurality of predetermined classes to the input audio signal and the processed audio signal, wherein the deviation measure is indicative of whether a different class has been attributed to the input audio signal and the processed audio signal. In some instances, classification evaluation module 525 comprises a classifier, e.g., an acoustic scene classifier, which may be sequentially run with the input audio signal and the processed audio signal. E.g., the classifier may employ one or more of the features described above in conjunction with statistical evaluation module 522 and/or psychoacoustic evaluation module 523 and/or spatial cues evaluation module 524 and/or cross-correlation evaluation module 526, or may be implemented as a deep neural network (DNN) based classifier. The deviation measure determined by classification evaluation module 525 may indicate differences in the classification of the input audio signal and the processed audio signal which can be indicative of the success or the failure of the signal processing performed in the system. To illustrate, a successful signal processing, in which a signal processing goal would comprise a denoising of the input audio signal, may be indicated by a deviation characteristic matching a deviation measure in which the input audio signal would be classified as 'speech in noise' and the processed audio signal would be classified as 'speech in silence'.

Figure 6:
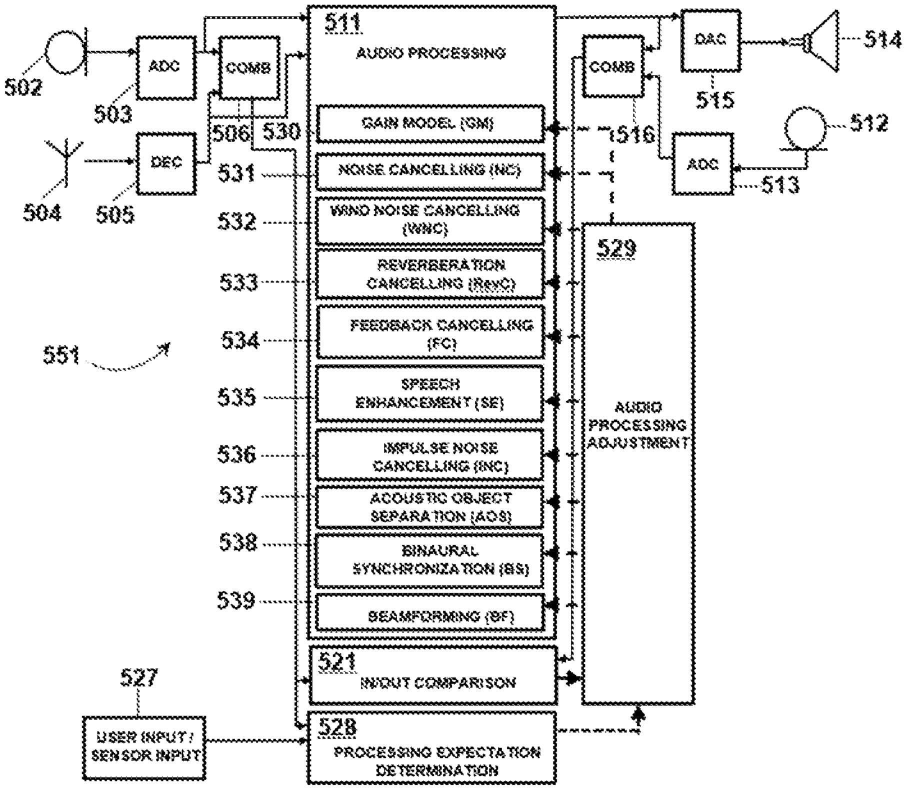

FIG. 6 illustrates a functional block diagram of another exemplary audio signal processing arrangement 551 that may be implemented by hearing device 110 and/or hearing system 310. Arrangement 551 substantially corresponds to arrangement 501, wherein audio processing module 511 is configured to process the input audio signal by a plurality of audio processing algorithms 531-539 which may be executed in a sequence and/or in parallel to generate the processed audio signal. As illustrated, audio processing algorithms 531-539 executed by audio processing module 511 may comprise at least one of a gain model (GM) 530, which may define an amplification characteristic, e.g., to compensate for an individual hearing loss of the user; a noise cancelling (NC) algorithm 531; a wind noise cancelling (WNC) algorithm 532; a reverberation cancelling (RevC) algorithm 533; a feedback cancelling (FC) algorithm 534; a speech enhancement (SE) algorithm 535; an impulse noise cancelling (INC) algorithm 536; an acoustic object separation (AOS) algorithm 537; a binaural synchronization (BS) algorithm 538; and a beamforming (BF) algorithm 539, in particular adapted for static and/or adaptive beamforming.

Gain model (GM) 530 may provide for an amplification of the input audio signal which may be adapted, e.g., fitted, to an individual hearing loss of the user. For instance, gain model (GM) 530 may be executed by default by audio processing module 511 to account for a previously known signal processing goal to compensate for the individual hearing loss of the user. An execution of gain model (GM) 530 may also be adjusted, e.g., when an audio classifier attributes at least one class such as low ambient noise, high ambient noise, traffic noise, music, machine noise, babble noise, public area noise, background noise, speech, non-speech, speech in quiet, speech in babble, speech in noise, speech from the user, speech from a significant other, background speech, speech from multiple sources, quiet indoor, quiet outdoor, speech in a car, speech in traffic, speech in a reverberating environment, speech in wind noise, speech in a lounge, car noise, applause, music, e.g. classical music, and/or the like is attributed to the input audio signal. For instance, gain model (GM) 530 may be selected by audio processing adjustment module 529 and controlled to adjust the processing of the input audio signal according to the predetermined adjustment instructions when a comparison of the input audio signal and the processed audio signal evaluated in a psychoacoustic model, which may be performed by psychoacoustic evaluation module 523 as described above, yields a deviation characteristic mismatching the expectation measure.

In some implementations, gain model (GM) 530 may comprise a gain compression (GC) algorithm which may be configured to provide for an amplification characteristic of the input audio signal which may depend on a loudness level of the audio content in the input audio signal. E.g., the amplification may be decreased, e.g., limited, for audio content having a higher signal level and/or the amplification may be increased, e.g., expanded, for audio content having a lower signal level. An operation of the gain compression (GC) algorithm may also be adjusted when a classifier attributes at least one class such as low ambient noise, high ambient noise, traffic noise, music, machine noise, babble noise, public area noise, background noise, speech, non-speech, speech in quiet, speech in babble, speech in noise, speech from the user, speech from a significant other, background speech, speech from multiple sources, quiet indoor, quiet outdoor, speech in a car, speech in traffic, speech in a reverberating environment, speech in wind noise, speech in a lounge, car noise, applause, music, e.g. classical music, and/or the like is attributed to the input audio signal. For instance, the gain compression (GC) algorithm may be selected by audio processing adjustment module 529 and controlled to adjust the processing of the input audio signal according to the predetermined adjustment instructions when a mismatch between a deviation characteristic determined in a comparison of the input audio signal and the processed audio signal involving at least one statistical metrics, which may be performed by statistical evaluation module 522 as described above, and/or involving at least one cross-correlation, which may be performed by cross-correlation evaluation module 526 as described above, and/or involving at least one classification of the input audio signal and the processed audio signal, which may be performed by classification evaluation module 525 as described above, and the expectation measure is determined.

In some implementations, gain model (GM) 530 may comprise a frequency compression (FreqC) algorithm which may be configured to provide for an amplification characteristic of the input audio signal which may depend on a frequency of the audio content in the input audio signal, e.g., to provide for audio content detected at higher frequencies an amplification shifted to a lower frequency band. For instance, the frequency compression (FreqC) algorithm may be selected by audio processing adjustment module 529 and controlled to adjust the processing of the input audio signal according to the predetermined adjustment instructions when a mismatch between a deviation characteristic determined in a comparison of the input audio signal and the processed audio signal involving at least one statistical metrics, which may be performed by statistical evaluation module 522 as described above, and/or involving at least one cross-correlation, which may be performed by cross-correlation evaluation module 526 as described above, and/or involving at least one classification of the input audio signal and the processed audio signal, which may be performed by classification evaluation module 525 as described above, and the expectation measure is determined.

Noise cancelling (NC) algorithm 531 can be configured to provide for a cancelling and/or suppression and/or cleaning of noise contained in the input audio signal. For instance, noise cancelling (NC) algorithm 531 may be executed by audio processing module 511 when a classifier included in audio processing expectation determination module 528 attributes at least one class such as low ambient noise, high ambient noise, traffic noise, noise, babble noise, public area noise, background noise, speech, nonspeech, speech in quiet, speech in noise, speech in loud noise, speech in traffic, car noise, applause, and/or the like to the input audio signal. A corresponding signal processing goal of the cancelling and/or suppression and/or cleaning of noise in the input audio signal may thus be predicted by audio processing expectation determination module 528. For instance, noise cancelling (NC) algorithm 531 may be selected by audio processing adjustment module 529 and controlled to adjust the processing of the input audio signal according to the predetermined adjustment instructions when in a comparison of the input audio signal and the processed audio signal involving at least one statistical metrics, which may be performed by statistical evaluation module 522 as described above, a deviation characteristic mismatching the expectation measure is determined.

Wind noise cancelling (WNC) algorithm 532 can be configured to provide for a cancelling and/or suppression and/or cleaning of wind noise contained in the input audio signal. For instance, wind noise cancelling (WNC) algorithm 531 may be executed by audio processing module 511 when a classifier included in audio processing expectation determination module 528 attributes at least one class such as wind noise to the input audio signal. A corresponding signal processing goal of the cancelling and/or suppression and/or cleaning of wind noise in the input audio signal may thus be predicted by audio processing expectation determination module 528. For instance, wind noise cancelling (WNC) algorithm 532 may be selected by audio processing adjustment module 529 and controlled to adjust the processing of the input audio signal according to the predetermined adjustment instructions when in a comparison of the input audio signal and the processed audio signal involving at least one statistical metrics, which may be performed by statistical evaluation module 522 as described above, a deviation characteristic mismatching the expectation measure is determined.

Reverberation cancelling (RevC) algorithm 533 can be configured to provide for a cancelling and/or suppression and/or cleaning of reverberations contained in the input audio signal. For instance, reverberation cancelling (RevC) algorithm 533 may be executed by audio processing module 511 when a classifier included in audio processing expectation determination module 528 attributes at least one class such as reverberations and/or speech in a reverberating environment and/or the like to the input audio signal. A corresponding signal processing goal of the cancelling and/or suppression and/or cleaning of reverberations in the input audio signal may thus be predicted by audio processing expectation determination module 528. For instance, reverberation cancelling (RevC) algorithm 533 may be selected by audio processing adjustment module 529 and controlled to adjust the processing of the input audio signal according to the predetermined adjustment instructions when a mismatch between a deviation characteristic determined in a comparison of the input audio signal and the processed audio signal involving at least one statistical metrics, which may be performed by statistical evaluation module 522 as described above, and/or involving at least one cross-correlation, which may be performed by cross-correlation evaluation module 526 as described above, and the expectation measure is determined.

Feedback cancelling (FC) algorithm 534 can be configured to provide for a cancelling and/or suppression and/or cleaning of feedback contained in the input audio signal. For instance, feedback cancelling (FC) algorithm 534 may be executed by default by audio processing module 511 to account for a previously known signal processing goal to compensate for the feedback which may be present in the input audio signal. For instance, feedback cancelling (FC) algorithm 534 may be selected by audio processing adjustment module 529 and controlled to adjust the processing of the input audio signal according to the predetermined adjustment instructions when a mismatch between a deviation characteristic determined in a comparison of the input audio signal and the processed audio signal involving at least one statistical metrics, which may be performed by statistical evaluation module 522 as described above, and/or involving at least one cross-correlation, which may be performed by cross-correlation evaluation module 526 as described above, and the expectation measure is determined.

Speech enhancement (SE) algorithm 535 can be configured to provide for an enhancement and/or amplification and/or augmentation of speech contained in the input audio signal. For instance, speech enhancement (SE) algorithm 535 may be executed by audio processing module 511 when a classifier included in audio processing expectation determination module 528 attributes at least one class such as speech, speech in quiet, speech in babble, speech in noise, speech in loud noise, speech from the user, speech from a significant other, background speech, speech from multiple sources, speech in a car, speech in traffic, speech in a reverberating environment, speech in wind noise and/or the like to the input audio signal. A corresponding signal processing goal of the enhancement and/or amplification and/or augmentation of speech contained in the input audio signal may thus be predicted by audio processing expectation determination module 528. For instance, speech enhancement (SE) algorithm 535 may be selected by audio processing adjustment module 529 and controlled to adjust the processing of the input audio signal according to the predetermined adjustment instructions when a mismatch between a deviation characteristic determined in a comparison of the input audio signal and the processed audio signal involving at least one statistical metrics, which may be performed by statistical evaluation module 522 as described above, and/or involving at least one cross-correlation, which may be performed by cross-correlation evaluation module 526 as described above, and/or involving at least one classification of the input audio signal and the processed audio signal, which may be performed by classification evaluation module 525 as described above, and the expectation measure is determined.

Impulse noise cancelling (INC) algorithm 536 may be configured to determine a presence of an impulse in the input audio signal and to reduce a signal level of the input audio signal at the impulse, e.g., to reduce an occurrence of sudden loud sounds in the input audio signal, wherein the signal may be kept at a level such that the sound remains audible by the user and/or, when an occurrence of speech is determined at the impulse, the signal level is not reduced. For instance, impulse noise cancelling (INC) algorithm 536 may be executed by default by audio processing module 511 to account for a previously known signal processing goal to reduce an occurrence of sudden loud sounds. An operation of gain compression (GC) algorithm 536 may also be adjusted when a classifier attributes at least one class such as traffic noise, music, machine noise, babble noise, public area noise to the input audio signal. For instance, impulse noise cancelling (INC) algorithm 536 may be selected by audio processing adjustment module 529 and controlled to adjust the processing of the input audio signal according to the predetermined adjustment instructions when a mismatch between a deviation characteristic determined in a comparison of the input audio signal and the processed audio signal involving at least one statistical metrics, which may be performed by statistical evaluation module 522 as described above, and/or involving at least one cross-correlation, which may be performed by cross-correlation evaluation module 526 as described above, and/or involving at least one classification of the input audio signal and the processed audio signal, which may be performed by classification evaluation module 525 as described above, and the expectation measure is determined.

Acoustic object separation (AOS) algorithm 537 can be configured to separate audio content representative of sound emitted by at least one acoustic object from the input audio signal. More recently, machine learning (ML) algorithms have been employed to classify the ambient sound. In this regard, acoustic object separation (AOS) algorithm 537 may be configured to classify the audio signal by at least one deep neural network (DNN). The classifier may comprise an acoustic object separator configured to separate sound generated by different acoustic objects, for instance a conversation partner, passengers passing by the user, vehicles moving in the vicinity of the user such as cars, airborne traffic such as a helicopter, a sound scene in a restaurant, a sound scene including road traffic, a sound scene during public transport, a sound scene in a home environment, and/or the like. Examples of such an acoustic object separator are disclosed in international patent application Nos. PCT/EP 2020/051 734 and PCT/EP 2020/051 735, and in German patent application No. DE 2019 206 743.3. The separated audio content generated by the different acoustic objects can then be further processed, e.g., by emphasizing the audio content generated by one acoustic object relative to the audio content generated by another acoustic object and/or by suppressing the audio content generated by another acoustic object. A corresponding signal processing goal of the audio content separation and/or emphasizing or suppressing dedicated acoustic objects in the input audio signal may be predicted by audio processing expectation determination module 528, e.g., depending on a classifier included in audio processing expectation determination module 528 attributing at least one corresponding class to the input audio signal, wherein such a classifier may be also be implemented by the acoustic object separator of acoustic object separation (AOS) algorithm 537, and/or may be selected by the user via user interface 137, 527. For instance, acoustic object separation (AOS) algorithm 537 may be selected by audio processing adjustment module 529 and controlled to adjust the processing of the input audio signal according to the predetermined adjustment instructions when a mismatch between a deviation characteristic determined in a comparison of the input audio signal and the processed audio signal involving at least one statistical metrics, which may be performed by statistical evaluation module 522 as described above, and/or involving at least one cross-correlation, which may be performed by cross-correlation evaluation module 526 as described above, and/or involving at least one classification of the input audio signal and the processed audio signal, which may be performed by classification evaluation module 525 as described above, e.g., by acoustic object separation (AOS) algorithm 537, and the expectation measure is determined.

Binaural synchronization (BS) algorithm 538 can be configured to provide for a synchronization between an input audio signal received from input transducer 115, 125, 502 in first hearing device 110 and from input transducer 115, 125, 502 in second hearing device 120 of hearing system 310, e.g., with regard to binaural cues indicative of a difference of a sound detected on a left and a right ear of the user. For instance, binaural synchronization (BS) algorithm 538 may be executed by audio processing module 511 when a classifier included in audio processing expectation determination module 528 attributes at least one class such as speech, nonspeech, speech in quiet, speech in babble, speech in noise, speech from the user, speech from a significant other, background speech, speech from multiple sources, speech in a car, speech in traffic, speech in a reverberating environment, speech in wind noise, speech in a lounge, music and/or the like to the input audio signal. A corresponding signal processing goal of the synchronization between an input audio signals may thus be predicted by audio processing expectation determination module 528. For instance, binaural synchronization (BS) algorithm 538 may be selected by audio processing adjustment module 529 and controlled to adjust the processing of the input audio signal according to the predetermined adjustment instructions when a mismatch between a deviation characteristic determined in a comparison of the input audio signal and the processed audio signal involving at least one binaural cue, which may be performed by spatial cues evaluation module 524 as described above, and/or involving at least one cross-correlation, which may be performed by spatial cues evaluation module 524 as described above.

Beamforming (BF) algorithm 539 can be configured to provide for a beamforming of audio content in the input audio signal, e.g., with regard to a location of an acoustic object in the environment of the user and/or with regard to a direction of arrival (DOA) of sound detected by input transducer 115, 125, 502 and/or with regard to a directivity of the acoustic beam in a front and/or back direction of the user. In some implementations, when beamforming (BF) algorithm 539 is configured for binaural beamforming, beamforming (BF) algorithm 539 may be executed in a sequence with binaural synchronization (BS) algorithm 538. For instance, beamforming (BF) algorithm 539 may be executed by audio processing module 511 when a classifier included in audio processing expectation determination module 528 attributes at least one class such as speech, nonspeech, speech in quiet, speech in babble, speech in noise, speech from the user, speech from a significant other, background speech, speech from multiple sources, speech in a car, speech in traffic, speech in a reverberating environment, speech in wind noise, speech in a lounge, music and/or the like to the input audio signal. A corresponding signal processing goal of the synchronization between an input audio signals may thus be predicted by audio processing expectation determination module 528. A corresponding signal processing goal of the synchronization between an input audio signals may thus be predicted by audio processing expectation determination module 528. For instance, beamforming (BF) algorithm 538 may be selected by audio processing adjustment module 529 and controlled to adjust the processing of the input audio signal according to the predetermined adjustment instructions when a mismatch between a deviation characteristic determined in a comparison of the input audio signal and the processed audio signal involving at least one binaural cue, which may be performed by spatial cues evaluation module 524 as described above, and/or involving at least one cross-correlation, which may be performed by spatial cues evaluation module 524 as described above.

Figure 7:
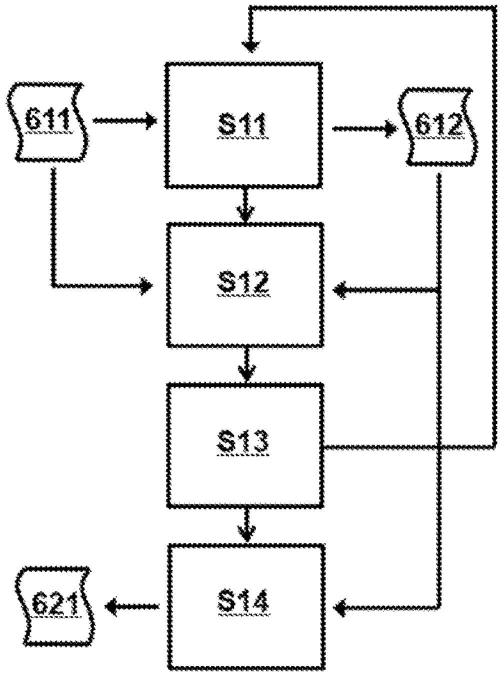
FIGS. 7-8 schematically illustrate some exemplary methods of processing an input audio signal according to principles described herein.

FIG. 7 illustrates a block flow diagram for an exemplary method of optimizing audio processing in a hearing device configured to be worn at an ear of a user. The method may be executed by processor 112 of hearing device 110 and/or processor 122 of hearing device 120 and/or another processor communicatively coupled to processor 112, 122. At operation S11, input audio signal 611, as provided by input transducer 115, 125, 502 and/or by audio signal receiver 116, 126 is received and processed by a plurality of audio processing algorithms 531-539 executed in a sequence and/or in parallel to generate a processed audio signal 612. At operation S12, input audio signal 611 and processed audio signal 612 are compared to determine at least one deviation characteristic indicative of a deviation of the processed audio signal 612 from the input audio signal 611. At operation S13, at least one of the executed audio processing algorithms 531-539 is selected depending on the deviation characteristic and controlled to adjust the processing of input audio signal 611. E.g., the at least one selected audio processing algorithms 531-539 may be controlled to adjust the processing of input audio signal 611 according to predetermined adjustment instructions and/or according to adjustment instructions which depend on the deviation characteristic. At operation S14, an output audio signal 621 is output based on processed audio signal 612 so as to stimulate the user's hearing. As illustrated, input audio signal 611 can be continuously received at S11. Furthermore, input audio signal 611 and processed audio signal 612 can be continuously received at S12. Correspondingly, operations S11, S12, S13 may also be continuously performed with regard to the continuously received input audio signal 611 and processed audio signal 612.

Figure 8:
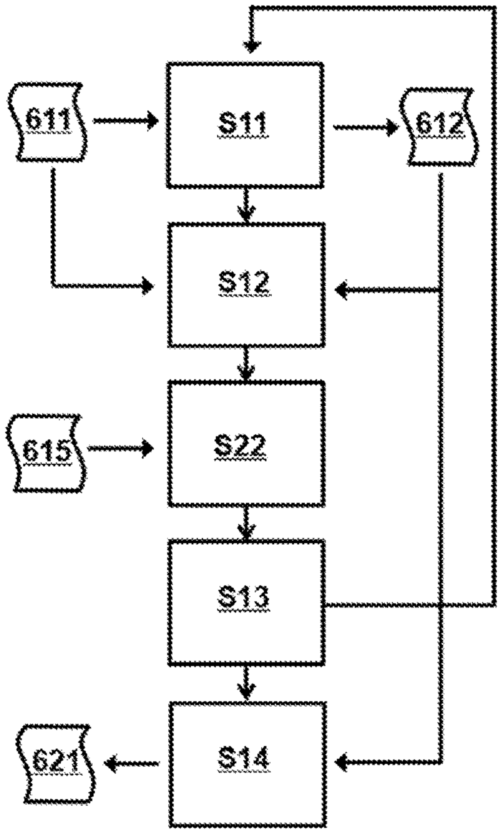

FIG. 8 illustrates a block flow diagram for another exemplary method of optimizing audio processing in a hearing device configured to be worn at an ear of a user. As illustrated, the method comprises an additional operation S22 which may be performed between operations S12 and S13 in the method illustrated in FIG. 7. At operation S22, an expectation measure 615 indicative of an expected deviation of processed audio signal 612 from input audio signal 611 corresponding to a desired outcome of said processing of input audio signal 611 is provided. Further at operation S22, it is determined whether the deviation characteristic matches the expectation measure 615. At subsequent operation S13, the selecting of the at least one audio processing algorithm 531-539 and the controlling of the selected audio processing algorithm 531-539 is performed in a case in which a mismatch between the deviation characteristic and expectation measure 615 has been determined at S22. E.g., the at least one selected audio processing algorithms 531-539 may be controlled to adjust the processing of input audio signal 611 according to predetermined adjustment instructions and/or according to adjustment instructions which depend on the deviation characteristic. For instance, when a large deviation between the deviation characteristic and expectation measure 615 has been determined at S22, the adjustment instructions may be provided such that they have a larger impact on the processing of input audio signal 611 by the selected audio processing algorithm 531-539 as compared to, when a small deviation between the deviation characteristic and expectation measure 615 has been determined at S22, the adjustment instructions may be provided such that they have a smaller impact on the processing of input audio signal 611 by the selected audio processing algorithm 531-539.

While the principles of the disclosure have been described above in connection with specific devices and methods, it is to be clearly understood that this description is made only by way of example and not as limitation on the scope of the invention. The above described embodiments are intended to illustrate the principles of the invention, but not to limit the scope of the invention. Various other embodiments and modifications to those embodiments may be made by those skilled in the art without departing from the scope of the present invention that is solely defined by the claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A method of optimizing audio processing in a hearing device configured to be worn at an ear of a user, the method comprising:

receiving an input audio signal;

processing the input audio signal by a plurality of audio processing algorithms executed in a sequence and/or in parallel to generate a processed audio signal; and outputting, by an output transducer included in the hearing device, an output audio signal based on the processed audio signal so as to stimulate the user's hearing;

characterized by comparing the input audio signal and the processed audio signal to determine at least one deviation characteristic indicative of a deviation of the processed audio signal from the input audio signal;

selecting, depending on the deviation characteristic, at least one of the audio processing algorithms;

controlling the selected audio processing algorithm to adjust the processing of the input audio signal;

providing an expectation measure indicative of an expected deviation of the processed audio signal from the input audio signal corresponding to a desired outcome of said processing of the input audio signal; and determining whether said deviation characteristic matches the expectation measure, wherein said selecting of the audio processing algorithm and said controlling of the selected audio processing algorithm are performed in a case in which a mismatch between said deviation characteristic and the expectation measure has been determined.

2. The method of claim 1, further comprising:

determining said desired outcome of said processing of the input audio signal based on at least one of the input audio signal;

movement data provided by a movement sensor;

physiological data provided by a physiological sensor;

environmental data provided by an environmental sensor;

a user input entered via a user interface; and location data and/or time data; and determining, based on the determined desired outcome of said processing of the input audio signal, said expectation measure.

3. The method of claim 1, further comprising:

comparing, after said controlling of the selected audio processing algorithm, the input audio signal and the processed audio signal to repeat said determining of said at least one deviation characteristic; and determining whether said repeatedly determined deviation characteristic converges to the expectation measure.

4. The method of claim 1, wherein said desired outcome of said processing of the input audio signal comprises at least one of:

an enhancement of a speech content of a single talker in the input audio signal;

an enhancement of a speech content of a plurality of talkers in the input audio signal;

a reproduction of sound emitted by an acoustic object in an environment of the user encoded in the input audio signal;

a reproduction of sound emitted by a plurality of acoustic objects in the environment of the user encoded in the input audio signal;

a reduction and/or cancelling of noise and/or reverberations in the input audio signal;

a preservation of acoustic cues contained in the input audio signal;

a suppression of noise in the input audio signal;

an improvement of a signal to noise ratio in the input audio signal;

a spatial resolution of sound encoded in the input audio signal depending on a direction of arrival of the sound and/or depending on a location of at least one acoustic object emitting the sound in the environment of the user;

a directivity of an audio content in the input audio signal provided by a beamforming or a preservation of an omnidirectional audio content in the input audio signal;

an amplification of sound encoded in the input audio signal adapted to an individual hearing loss of the user; or an enhancement of music content in the input audio signal.

5. The method of claim 1, further comprising:

classifying the input audio signal by attributing at least one class from a plurality of predetermined classes to the input audio signal, wherein said desired outcome of said processing of the input audio signal is determined depending on the class attributed to the input audio signal.

6. The method of claim 1, wherein said audio processing algorithms comprise at least one of a gain model;

a noise cancelling algorithm;

a wind noise cancelling algorithm;

a reverberation cancelling algorithm;

a feedback cancelling algorithm;

a speech enhancement algorithm;

an impulse noise cancelling algorithm;

a acoustic object separation algorithm;

a binaural synchronization algorithm; or a beamforming algorithm.

7. The method of claim 1, wherein, before said comparing of the input audio signal and the processed audio signal, at least one statistical metrics is determined from the input audio signal and the processed audio signal, wherein, during said comparing of the input audio signal and the processed audio signal, the statistical metrics of the input audio signal is compared with the statistical metrics of the processed audio signal.

8. The method of claim 1, further comprising:

evaluating, before said comparing of the input audio signal and the processed audio signal, the input audio signal in a psychoacoustic model of a hearing perception of a person without a hearing loss;

evaluating, before said comparing of the input audio signal and the processed audio signal, the processed audio signal in a psychoacoustic model of a hearing perception of an individual hearing loss of the user;

determining, from said evaluated input audio signal and said evaluated processed audio signal in the respective psychoacoustic model, said at least one deviation characteristic.

9. The method of claim 1, further comprising:

determining, during said comparing of the input audio signal and the processed audio signal, a correlation between the input audio signal and the processed audio signal, wherein the deviation characteristic is indicative of an amount and/or an absence of said correlation; and/or determining, during said comparing of the input audio signal and the processed audio signal, an amount of a temporal dispersion of an impulse in the processed audio signal relative to the amount of temporal dispersion of the impulse in the input audio signal, wherein the deviation characteristic is indicative of an amount of said temporal dispersion.

10. The method of claim 1, wherein said comparing of the input audio signal and the processed audio signal is performed in a time domain.

11. The method of claim 1, wherein, before the receiving of the input audio signal, the input audio signal is converted from an analog signal into a digital signal.

12. A method of optimizing audio processing in a hearing device configured to be worn at an ear of a user, the method comprising:

receiving an input audio signal;

processing the input audio signal by a plurality of audio processing algorithms executed in a sequence and/or in parallel to generate a processed audio signal; and outputting, by an output transducer included in the hearing device, an output audio signal based on the processed audio signal so as to stimulate the user's hearing;

characterized by comparing the input audio signal and the processed audio signal to determine at least one deviation characteristic indicative of a deviation of the processed audio signal from the input audio signal;

selecting, depending on the deviation characteristic, at least one of the audio processing algorithms;

controlling the selected audio processing algorithm to adjust the processing of the input audio signal;

evaluating, before said comparing of the input audio signal and the processed audio signal, the input audio signal with regard to spatial cues indicative of a difference of a sound detected on a different position at the user and/or binaural cues indicative of a difference of a sound detected at a left and a right ear of the user;

evaluating, before said comparing of the input audio signal and the processed audio signal, the processed audio signal with regard to said spatial and/or binaural cues; and determining, from said evaluating of the input audio signal and the processed audio signal with regard to said spatial and/or binaural cues, said at least one deviation characteristic.

13. The method of claim 12, further comprising:

determining, during said comparing of the input audio signal and the processed audio signal, a correlation between the input audio signal and the processed audio signal, wherein the deviation characteristic is indicative of an amount and/or an absence of said correlation; and/or determining, during said comparing of the input audio signal and the processed audio signal, an amount of a temporal dispersion of an impulse in the processed audio signal relative to the amount of temporal dispersion of the impulse in the input audio signal, wherein the deviation characteristic is indicative of an amount of said temporal dispersion.

14. The method of claim 12, wherein said comparing of the input audio signal and the processed audio signal is performed in a time domain.

15. The method of claim 12, wherein, before the receiving of the input audio signal, the input audio signal is converted from an analog signal into a digital signal.

16. A method of optimizing audio processing in a hearing device configured to be worn at an ear of a user, the method comprising:

receiving an input audio signal;

processing the input audio signal by a plurality of audio processing algorithms executed in a sequence and/or in parallel to generate a processed audio signal; and outputting, by an output transducer included in the hearing device, an output audio signal based on the processed audio signal so as to stimulate the user's hearing;

characterized by comparing the input audio signal and the processed audio signal to determine at least one deviation characteristic indicative of a deviation of the processed audio signal from the input audio signal;

selecting, depending on the deviation characteristic, at least one of the audio processing algorithms;

controlling the selected audio processing algorithm to adjust the processing of the input audio signal; and classifying the input audio signal and the processed audio signal by attributing at least one class from a plurality of predetermined classes to the input audio signal and the processed audio signal, wherein a deviation measure is indicative of whether a different class has been attributed to the input audio signal and the processed audio signal.

17. The method of claim 16, further comprising:

determining, during said comparing of the input audio signal and the processed audio signal, a correlation between the input audio signal and the processed audio signal, wherein the deviation characteristic is indicative of an amount and/or an absence of said correlation; and/or determining, during said comparing of the input audio signal and the processed audio signal, an amount of a temporal dispersion of an impulse in the processed audio signal relative to the amount of temporal dispersion of the impulse in the input audio signal, wherein the deviation characteristic is indicative of an amount of said temporal dispersion.

18. The method of claim 16, wherein said comparing of the input audio signal and the processed audio signal is performed in a time domain.

19. The method of claim 16, wherein, before the receiving of the input audio signal, the input audio signal is converted from an analog signal into a digital signal.

* * * * *